US012558790B2

(12) United States Patent
Sahloul et al.

(10) Patent No.: US 12,558,790 B2
(45) Date of Patent: Feb. 24, 2026

(54) METHOD AND COMPUTING SYSTEMS FOR PERFORMING OBJECT DETECTION

(71) Applicant: MUJIN, INC., Tokyo (JP)

(72) Inventors: Hamdi Sahloul, Tokyo (JP); Jose Jeronimo Moreira Rodrigues, Tokyo (JP); Jinze Yu, Tokyo (JP)

(73) Assignee: MUJIN, INC., Tokyo (JP)

( * ) Notice: Subject to any disclaimer, the term of this patent is extended or adjusted under 35 U.S.C. 154(b) by 460 days.

(21) Appl. No.: 17/733,079

(22) Filed: Apr. 29, 2022

(65) Prior Publication Data

US 2022/0366694 A1     Nov. 17, 2022

Related U.S. Application Data

(60) Provisional application No. 63/183,691, filed on May 4, 2021.

(51) Int. Cl.
B25J 9/16          (2006.01)

(52) U.S. Cl.
CPC ................................... B25J 9/1697 (2013.01)

(58) Field of Classification Search
CPC ...................................................... B25J 9/1697
See application file for complete search history.

(56) References Cited

U.S. PATENT DOCUMENTS 10,766,141 B1     9/2020   Diankov et al.
11,389,965 B2     7/2022   Yu et al.

2017/0300742 A1*   10/2017   Wei ...................... G06V 40/161
2020/0151844 A1*   5/2020   Kitajima ............. G06V 10/761
2021/0019891 A1*   1/2021   Yu ........................... G06T 7/174

FOREIGN PATENT DOCUMENTS

JP          6749034 B1      8/2020
JP          6765741 B1      9/2020

OTHER PUBLICATIONS

Japanese Office Action dated Sep. 20, 2022, issued in corresponding Japanese Application No. 2022-076111.

* cited by examiner

*Primary Examiner* — Wade Miles
*Assistant Examiner* — Aaron G Cain
(74) *Attorney, Agent, or Firm* — MEDLER FERRO WOODHOUSE & MILLS PLLC

(57)          ABSTRACT

A computing system including a communication interface and a processing circuit. The communication interface communicates with a robot and a camera having a field of view. The processing circuit performs obtaining image information based on objects within the field of view and determines a first template matching score which indicates a degree of match between the image information and an model template. The processing circuit further determines image edge information based on the image information and determines a second template matching score which indicates a degree of match between the image edge information and a template. The processing circuit additional determines an overall template matching score based on the first template matching score and the second template matching score.

20 Claims, 25 Drawing Sheets

System 1000

Computing System 1100

Camera 1200

System 1000A

Computing System 1100

Camera 1200A

Camera 1200B

System 1000

Computing System 1100

Camera 1200

FIG. 1A

System 1000A

Computing System 1100

Camera 1200A

Camera 1200B

System 1000C

Computing System 1100

Non-transitory computer-readable medium 1400

Camera 1200

FIG. 1D

Computing System 1100

Processing Circuit 1110

Non-transitory
compute-readable
medium 1120

FIG. 2A

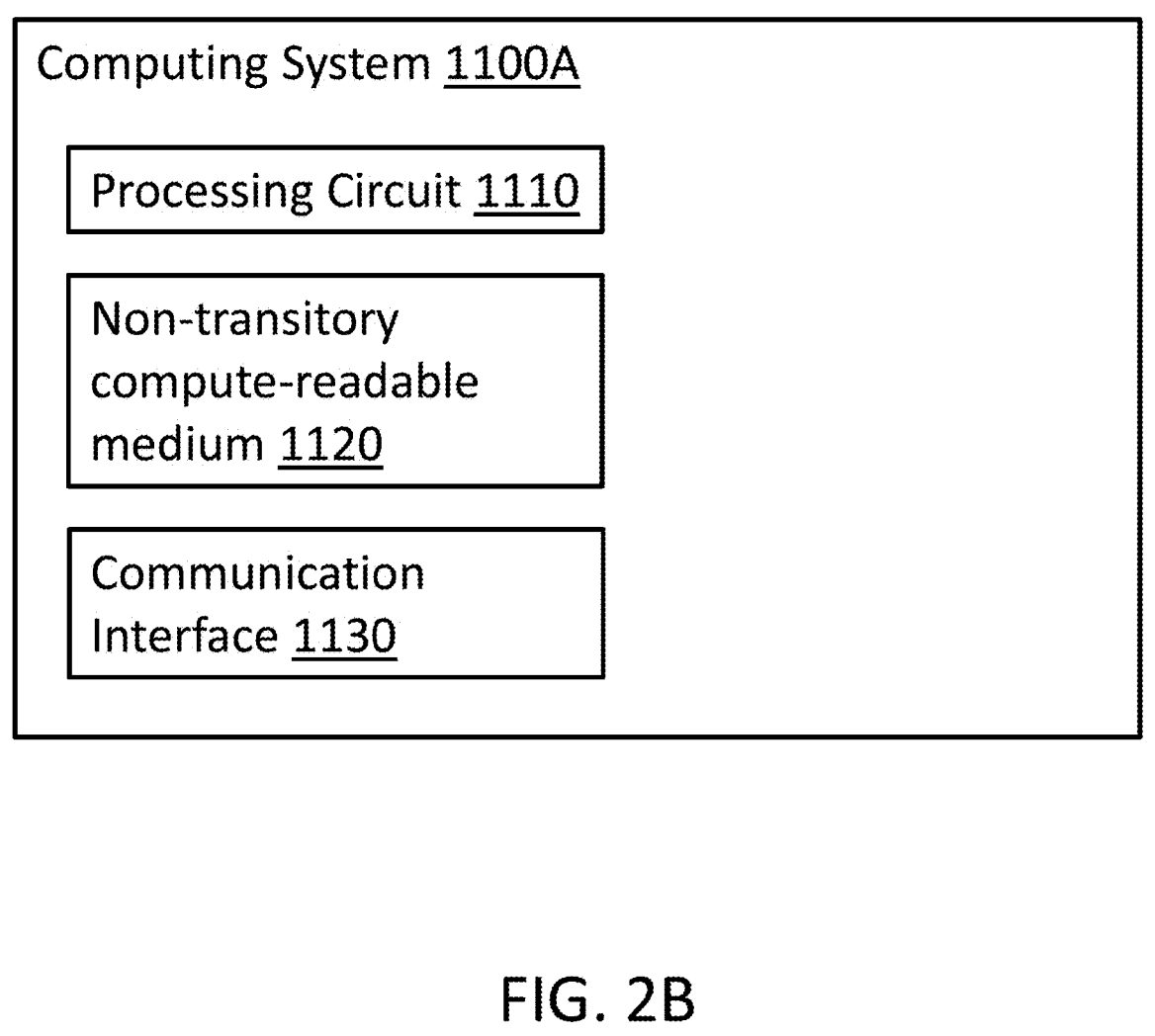

Computing System 1100A

Processing Circuit 1110

Non-transitory compute-readable medium 1120

Communication Interface 1130

FIG. 2B

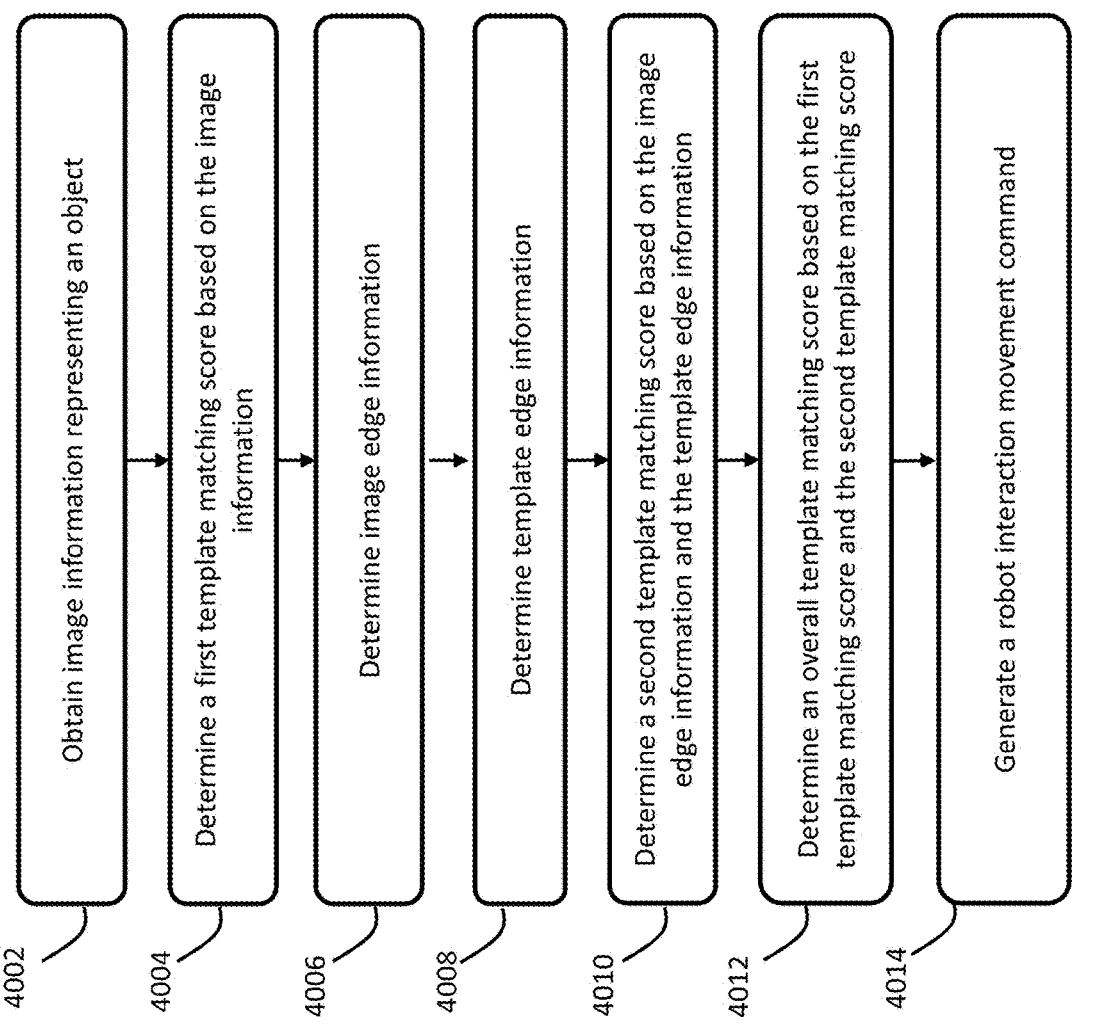

4002 — Obtain image information representing an object

4004 — Determine a first template matching score based on the image information

4006 — Determine image edge information

4008 — Determine template edge information

4010 — Determine a second template matching score based on the image edge information and the template edge information 4012 — Determine an overall template matching score based on the first template matching score and the second template matching score 4014 — Generate a robot interaction movement command

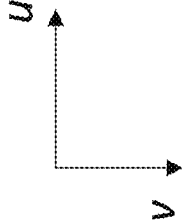
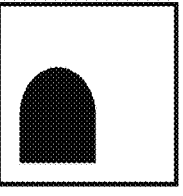
FIG. 5D

METHOD AND COMPUTING SYSTEMS FOR PERFORMING OBJECT DETECTION

CROSS-REFERENCE TO RELATED APPLICATION(S)

The present application claims the benefit of U.S. Provisional Appl. No. 63/183,691, entitled "A ROBOTIC SYSTEM FOR PERFORMING ATTENTION-BASED OR EDGE-BASED TEMPLATE MATCHING" and filed May 4, 2021, the entire content of which is incorporated by reference herein.

FIELD OF THE INVENTION

The present disclosure is related to computing systems and methods for edge-based template matching.

BACKGROUND

As automation becomes more common, robots are being used in more environments, such as in warehousing and retail environments. For instance, robots may be used to interact with objects in a warehouse. The movement of the robot may be fixed, or may be based on an input, such as information generated by a sensor in the warehouse.

BRIEF SUMMARY

According to an embodiment hereof, the present disclosure provides a computing system including a communication interface and at least one processing circuit. The communication interface is configured to communicate with a robot and with a camera having a camera field of view. The at least one processing circuit is configured, when one or more objects are or have been in the camera field of view to perform the following steps: obtaining image information representing a first object of the one or more objects, wherein the image information is generated by the camera and describes at least an object appearance associated with the first object; determining a first template matching score which indicates a degree of match between the image information and visual description information of an model template, wherein the visual description information describes an object appearance; determining image edge information based on the image information representing the first object, wherein the image edge information identifies a first set of one or more edges detected from the image information or indicates that no edge is detected from the image information; determining template edge information, wherein the template edge information identifies a second set of one or more edges detected from the visual description information of the model template or indicates that no edge is detected from the visual description information; determining a second template matching score which indicates a degree of match between the image edge information and the template edge information; and determining an overall template matching score based on the first template matching score and the second template matching score and performing a robot interaction planning operation based on the overall template matching score, wherein the robot interaction planning operation is for planning robot interaction between the robot and the first object.

In a further embodiment, and in combination with any other embodiments herein, the disclosure provides that the at least one processing circuit is configured, when the first set of one or more edges are detected from the image information, to generate the image edge information as a first edge bitmap which identifies where the first set of one or more edges are located. The at least one processing circuit is further configured to generate the second template matching score based on a comparison between the first edge bitmap and the second edge bitmap, wherein the second edge bitmap identifies where a second set of one or more edges are located in the model template based on visual description information.

In a further embodiment, and in combination with any other embodiments herein, the disclosure provides that the at least one processing circuit is configured to determine the second template matching score based on a maximum amount by which the first set of one or more edges detected from the image information is overlapping with the second set of one or more edges from the visual description information of the model template.

In a further embodiment, and in combination with any other embodiments herein, the disclosure provides that the at least one processing circuit is configured to determine the second template matching score in a manner which is independent of a first template matching score.

In a further embodiment, and in combination with any other embodiments herein, the disclosure provides that the first edge bitmap is a first binary bitmap which includes at least area pixel pixels, wherein the area pixel pixels of the first binary bitmap are pixels thereof that are assigned a first pixel value. Further, when the first set of one or more edges are detected from the image information, the first binary bitmap further includes edge pixels, wherein the edge pixels of the first binary bitmap are pixels thereof that correspond to locations in the image information at which the first set of one or more edges are detected, wherein the edge pixels of the first binary bitmap are assigned a second pixel value. The second edge bitmap is a second binary bitmap which includes at least area pixel pixels, wherein the area pixel pixels of the second binary bitmap are pixels thereof that are assigned the first pixel value. When the second set of one or more edges are detected from the visual description information of the model template, the second binary bitmap further includes edge pixels, wherein the edge pixels of the second binary bitmap are pixels thereof that correspond to locations in the visual description information at which the second set of one or more edges are detected, and wherein the edge pixels of the second binary bitmap are assigned the second pixel value.

In a further embodiment, and in combination with any other embodiments herein, the disclosure provides that the at least one processing circuit is configured to determine the second template matching score based on a maximum amount the edge pixels of the first binary bitmap is overlapping with the edge pixels of the second binary bitmap.

In a further embodiment, and in combination with any other embodiments herein, the disclosure provides that the at least one processing circuit is configured to determine, for each edge of the first set of one or more edges, a respective priority level for the edge based on a technique by which the edge is detected from the image information, wherein the second template matching score is based on one or more respective priority levels associated with the first set of one or more edges.

In a further embodiment, and in combination with any other embodiments herein, the disclosure provides that the at least one processing circuit is configured to determine a respective priority level for each edge of the first set of one or more edges based on which one of the following techniques is used to detect the edge: (i) satisfying a defined pixel intensity discontinuity condition or a defined spiked pixel intensity condition at the edge, (ii) satisfying a defined depth discontinuity condition at the edge, or (iii) satisfying a defined orientation discontinuity condition at the edge.

In a further embodiment, and in combination with any other embodiments herein, the disclosure provides that the at least one processing circuit is configured to determine the first template matching score based on a degree of match between regions of the image information and corresponding regions of the visual description information.

In a further embodiment, and in combination with any other embodiments herein, the disclosure provides that when the visual description information of the model template includes pixels forming a template 2D region, the at least one processing circuit is configured to determine the first template matching score based on a degree of match between the template 2D region and a corresponding image 2D region that is from the image information or is generated based on the image information.

In a further embodiment, and in combination with any other embodiments herein, the disclosure provides that the at least one processing circuit is configured to perform an image normalization operation by generating, based on the image information, transformed image information which matches at least one of an object pose, viewpoint, or a lighting condition associated with the visual description information of the model template, and wherein the corresponding image 2D region is from the transformed image information.

In a further embodiment, and in combination with any other embodiments herein, the disclosure provides that the at least one processing circuit is configured to determine the first template matching score based on a size of overlap which indicates how many pixels in the template 2D region satisfy a defined pixel intensity similarity condition when compared to corresponding pixels of the image 2D region.

In a further embodiment, and in combination with any other embodiments herein, the disclosure provides that the at least one processing circuit is configured to determine the overall template matching score based on a weighted combination of the first template matching score and the second template matching score.

In a further embodiment, and in combination with any other embodiments herein, the disclosure provides that the at least one processing circuit is configured, when the first object is in the camera field of view, to determine whether a portion of the first object is not described by the image information, and in response to a determination that the portion of the first object is not described by the image information, to generate a masked version of the visual description information which excludes a corresponding portion of the visual description information, and to determine the first template matching score and determine the template edge information based on the masked version of the visual description information.

According to an alternative embodiment hereof, the present disclosure provides a non-transitory computer-readable medium including instructions for execution by at least one processing circuit in communication with a camera having a field of view and configured, when one or more objects are or have been in the field of view, the instructions being configured for: obtaining image information representing a first object of the one or more objects, wherein the image information is generated by the camera and describes at least an object appearance associated with the first object; determining a first template matching score which indicates a degree of match between the image information and visual description information of a model template, wherein the visual description information describes an object appearance; determining image edge information based on the image information representing the first object, wherein the image edge information identifies a first set of one or more edges detected from the image information, or indicates that no edge is detected from the image information; determining template edge information, wherein the template edge information identifies a second set of one or more edges detected from the visual description information of the model template, or indicates that no edge is detected from the visual description information; determining a second template matching score which indicates a degree of match between the image edge information and the template edge information; determining an overall template matching score based on the first template matching score and the second template matching score; and performing a robot interaction planning operation based on the overall template matching score, wherein the robot interaction planning operation is for planning robot interaction between the robot and the first object.

In a further embodiment, and in combination with any other embodiments herein, the disclosure provides that when the instruction are additionally configured for, when the first set of one or more edges are detected from the image information, to generate the image edge information as a first edge bitmap which identifies where the first set of one or more edges are located, and wherein the at least one processing circuit is configured to generate the second template matching score based on a comparison between the first edge bitmap and a second edge bitmap, wherein the second edge bitmap identifies where a second set of one or more edges are located in the model template based on visual description information.

In a further embodiment, and in combination with any other embodiments herein, the disclosure provides that the instructions are additionally configured for determining the second template matching score based on a maximum amount by which the first set of one or more edges detected from the image information is overlapping with the second set of one or more edges from the visual description information of the model template.

According to an alternative embodiment hereof, the present disclosure provides a method controlling a robotic system comprising a non-transitory computer-readable medium, at least one processing circuit in communication with a camera having a field of view and configured to execute instructions, the method including: obtaining image information representing a first object of the one or more objects, wherein the image information is generated by the camera and describes at least an object appearance associated with the first object; determining a first template matching score which indicates a degree of match between the image information and visual description information of a model template, wherein the visual description information describes an object appearance; determining image edge information based on the image information representing the first object, wherein the image edge information identifies a first set of one or more edges detected from the image information, or indicates that no edge is detected from the image information; determining template edge information, wherein the template edge information identifies a second set of one or more edges detected from the visual description information of the model template, or indicates that no edge is detected from the visual description information; determining a second template matching score which indicates a degree of match between the image edge information and the template edge information; determining an overall template matching score based on the first template matching score and the second template matching score; and performing a robot interaction planning operation based on the overall template matching score, wherein the robot interaction planning operation is for planning robot interaction between the robot and the first object.

In a further embodiment, and in combination with any other embodiments herein, the disclosure provides that when the instruction are additionally configured for, when the first set of one or more edges are detected from the image information, to generate the image edge information as a first edge bitmap which identifies where the first set of one or more edges are located, and wherein the at least one processing circuit is configured to generate the second template matching score based on a comparison between the first edge bitmap and a second edge bitmap, wherein the second edge bitmap identifies where a second set of one or more edges are located in the model template based on visual description information.

In a further embodiment, and in combination with any other embodiments herein, the disclosure provides that the instructions are additionally configured for determining the second template matching score based on a maximum amount by which the first set of one or more edges detected from the image information is overlapping with the second set of one or more edges from the visual description information of the model template.

BRIEF DESCRIPTION OF THE FIGURES

FIGS. 1A-1D illustrate systems for performing or facilitating physical edge detection, consistent with embodiments hereof.

FIGS. 2A-2D provide block diagrams that illustrate a computing system configured to perform or facilitate edge-based template matching, consistent with embodiments hereof.

FIG. 4 provides a flow diagram that illustrates a method of processing a candidate edge, according to an embodiment hereof.

FIGS. 5A-5D illustrate examples of 2D image information, 3D image information, and transformed image information, according to an embodiment hereof.

DETAILED DESCRIPTION

One aspect of the present disclosure relates to the computing system being configured to perform attention-based template matching, which may be used for detection validation. The attention-based template matching may involve determining whether an appearance of a scene represented by image information matches any model templates.

Figure 1A:
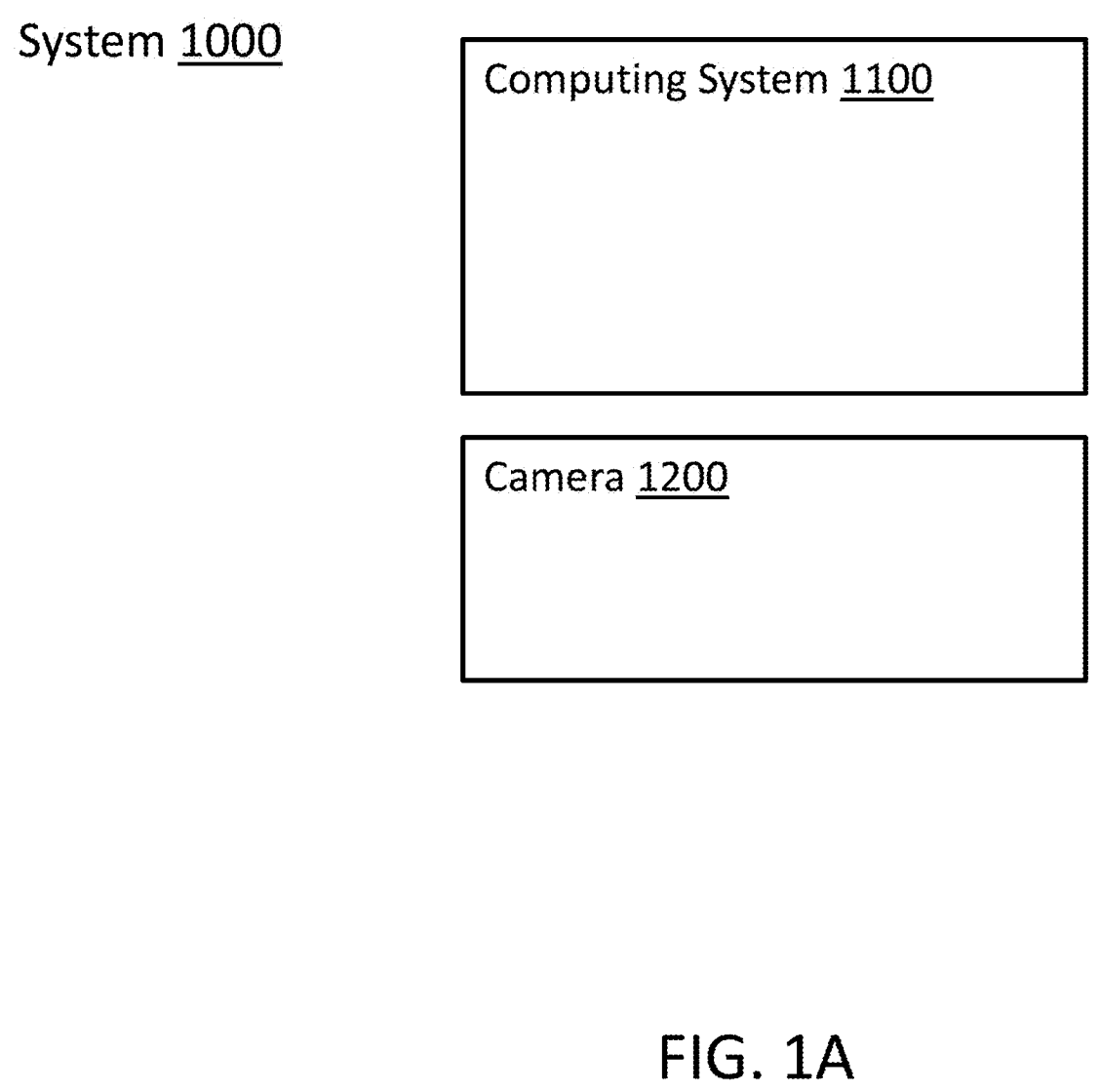

FIG. 1A illustrates a system 1000 for performing object detection, or, more specifically, object recognition. More particularly, the system 1000 may include a computing system 1100 and a camera 1200. In this example, the camera 1200 may be configured to generate image information which describes or otherwise represents an environment in which the camera 1200 is located, or, more specifically, represents an environment in the camera's 1200 field of view (also referred to as a camera field of view). The environment may be, e.g., a warehouse, a manufacturing plant, a retail space, or other premises. In such instances, the image information may represent objects located at such premises, such as boxes, bins, cases, crates, or other containers. The system 1000 may be configured to generate, receive, and/or process the image information, such as by using the image information to distinguish between individual objects in the camera field of view, to perform object recognition or object registration based on the image information, and/or perform robot interaction planning based on the image information, as discussed below in more detail (the terms "and/or" and "or" are used interchangeably in this disclosure). The robot interaction planning may be used to, e.g., control a robot at the premises to facilitate robot interaction between the robot and the containers or other objects. The computing system 1100 and the camera 1200 may be located at the same premises or may be located remotely from each other. For instance, the computing system 1100 may be part of a cloud computing platform hosted in a data center which is remote from the warehouse or retail space and may be communicating with the camera 1200 via a network connection.

Figure 1B:
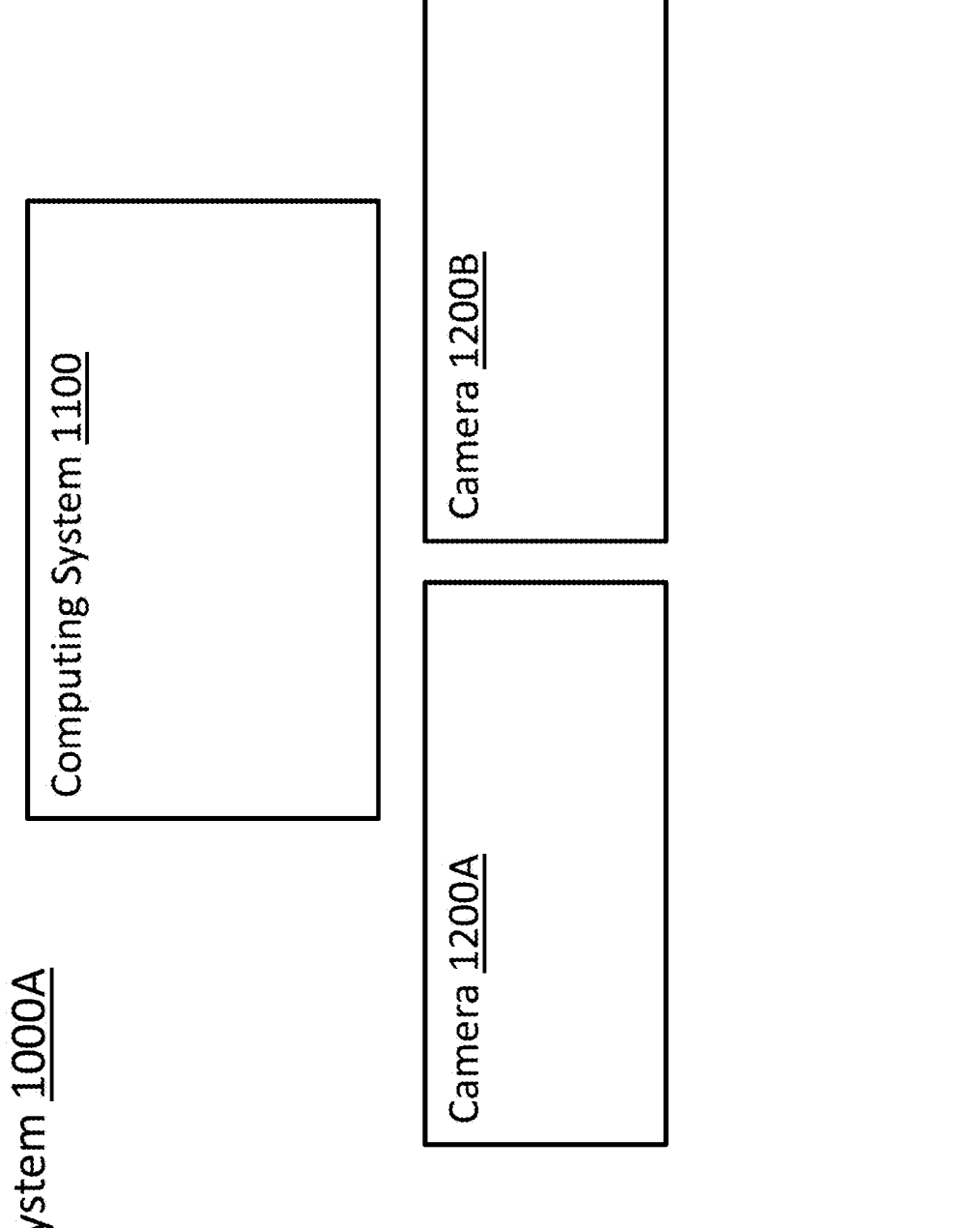

In an embodiment, the camera 1200 (which may also be referred to as an image sensing device) may be a 2D camera and/or a 3D camera. For example, FIG. 1B illustrates a system 1000A (which may be an embodiment of the system 1000) that includes the computing system 1100 as well as a camera 1200A and a camera 1200B, both of which may be an embodiment of the camera 1200. In this example, the camera 1200A may be a 2D camera that is configured to generate 2D image information which includes or forms a 2D image that describes a visual appearance of the environment in the camera's field of view. The camera 1200B may be a 3D camera (also referred to as a spatial structure sensing camera or spatial structure sensing device) that is configured to generate 3D image information which includes or forms spatial structure information regarding an environment in the camera's field of view. The spatial structure information may include depth information (e.g., a depth map) which describes respective depth values of various locations relative to the camera 1200B, such as locations on surfaces of various objects in the camera 1200's field of view. These locations in the camera's field of view or on an object's surface may also be referred to as physical locations. The depth information in this example may be used to estimate how the objects are spatially arranged in three-dimensional (3D) space. In some instances, the spatial structure information may include or may be used to generate a point cloud that describes locations on one or more surfaces of an object in the camera 1200B's field of view. More specifically, the spatial structure information may describe various locations on a structure of the object (also referred to as an object structure).

In an embodiment, the system 1000 may be a robot operation system for facilitating robot interaction between a robot and various objects in the environment of the camera

Figure 1C:
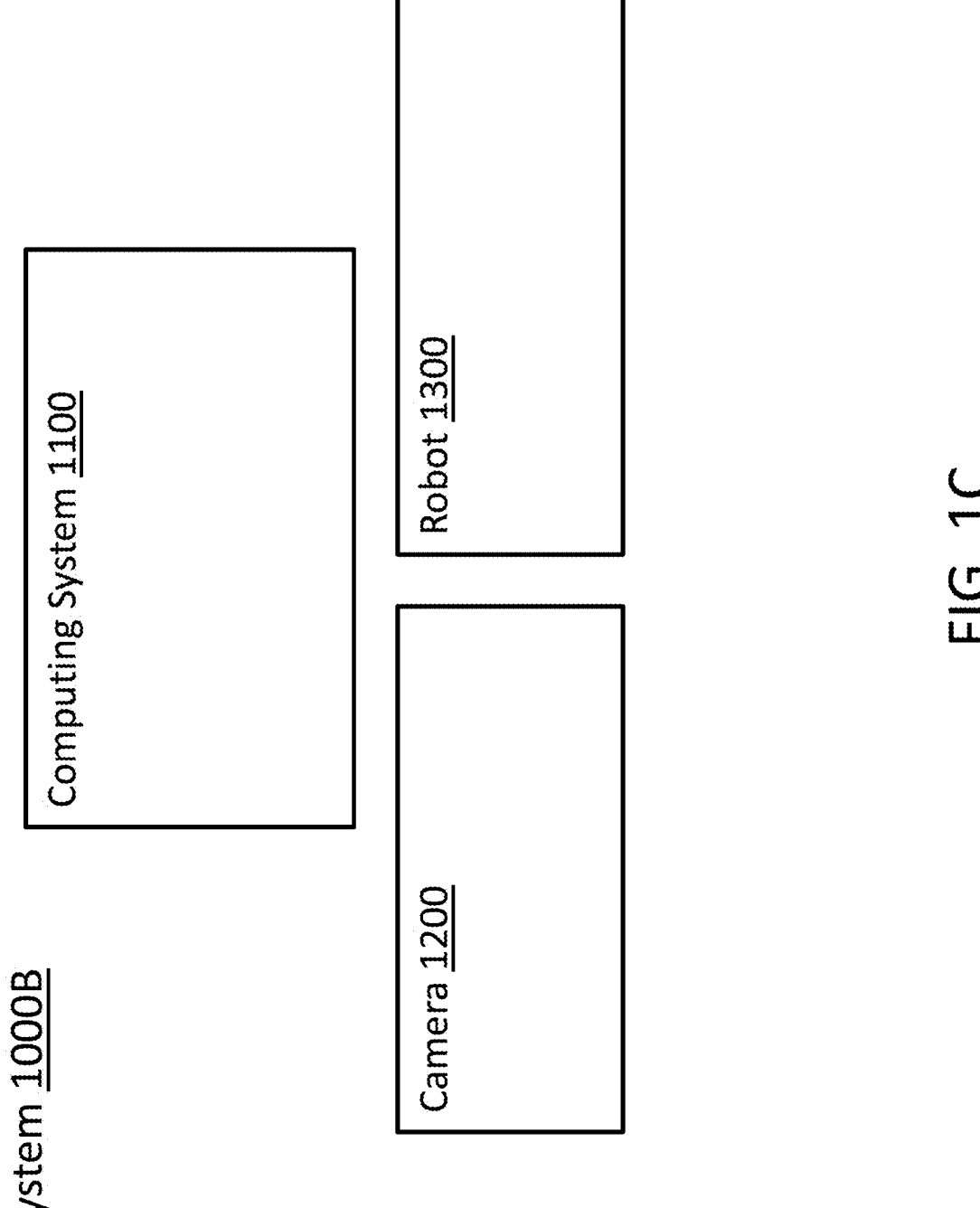

1200. For example, FIG. 1C illustrates a robot operation system 1000B, which may be an embodiment of the system 1000/1000A of FIGS. 1A and 1B. The robot operation system 1000B may include the computing system 1100, the camera 1200, and a robot 1300. As stated above, the robot 1300 may be used to interact with one or more objects in the environment of the camera 1200, such as with boxes, crates, bins, or other containers. For example, the robot 1300 may be configured to pick up the containers from one location and move them to another location. In some cases, the robot 1300 may be used to perform a de-palletization operation in which a group of containers or other objects are unloaded and moved to, e.g., a conveyor belt. In some implementations, the camera 1200 may be attached to the robot 1300, such as to a robot arm of the robot 1300. In some implementations, the camera 1200 may be separate from the robot 1300. For instance, the camera 1200 may be mounted to a ceiling of a warehouse or other structure and may remain stationary relative to the structure.

In an embodiment, the computing system 1100 of FIGS. 1A-1C may form or be integrated into the robot 1300, which may also be referred to as a robot controller. A robot control system may be included in the system 1000B, and is configured to e.g., generate commands for the robot 1300, such as a robot interaction movement command for controlling robot interaction between the robot 1300 and a container or other object. In such an embodiment, the computing system 1100 may be configured to generate such commands based on, e.g., image information generated by the camera 1200/1200A/1200B. For instance, the computing system 1100 may be configured to determine a motion plan based on the image information, wherein the motion plan may be intended for, e.g., gripping or otherwise picking up an object. The computing system 1100 may generate one or more robot interaction movement commands to execute the motion plan.

In an embodiment, the computing system 1100 may form or be part of a vision system. The vision system may be a system which generates, e.g., vision information which describes an environment in which the robot 1300 is located, or, alternatively or in addition to, describes an environment in which the camera 1200 is located. The vision information may include the 3D image information and/or the 2D image information discussed above, or some other image information. In some scenarios, if the computing system 1100 forms a vision system, the vision system may be part of the robot control system discussed above or may be separate from the robot control system. If the vision system is separate from the robot control system, the vision system may be configured to output information describing the environment in which the robot 1300 is located. The information may be outputted to the robot control system, which may receive such information from the vision system and performs motion planning and/or generates robot interaction movement commands based on the information. Further information regarding the vision system is detailed below.

In an embodiment, the computing system 1100 may communicate with the camera 1200 and/or with the robot 1300 via a direct connection, such as a connection provided via a dedicated wired communication interface, such as a RS-232 interface, a universal serial bus (USB) interface, and/or via a local computer bus, such as a peripheral component interconnect (PCI) bus. In an embodiment, the computing system 1100 may communicate with the camera 1200 and/or with the robot 1300 via a network. The network may be any type and/or form of network, such as a personal area network (PAN), a local-area network (LAN), e.g., Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

Figure 1D:
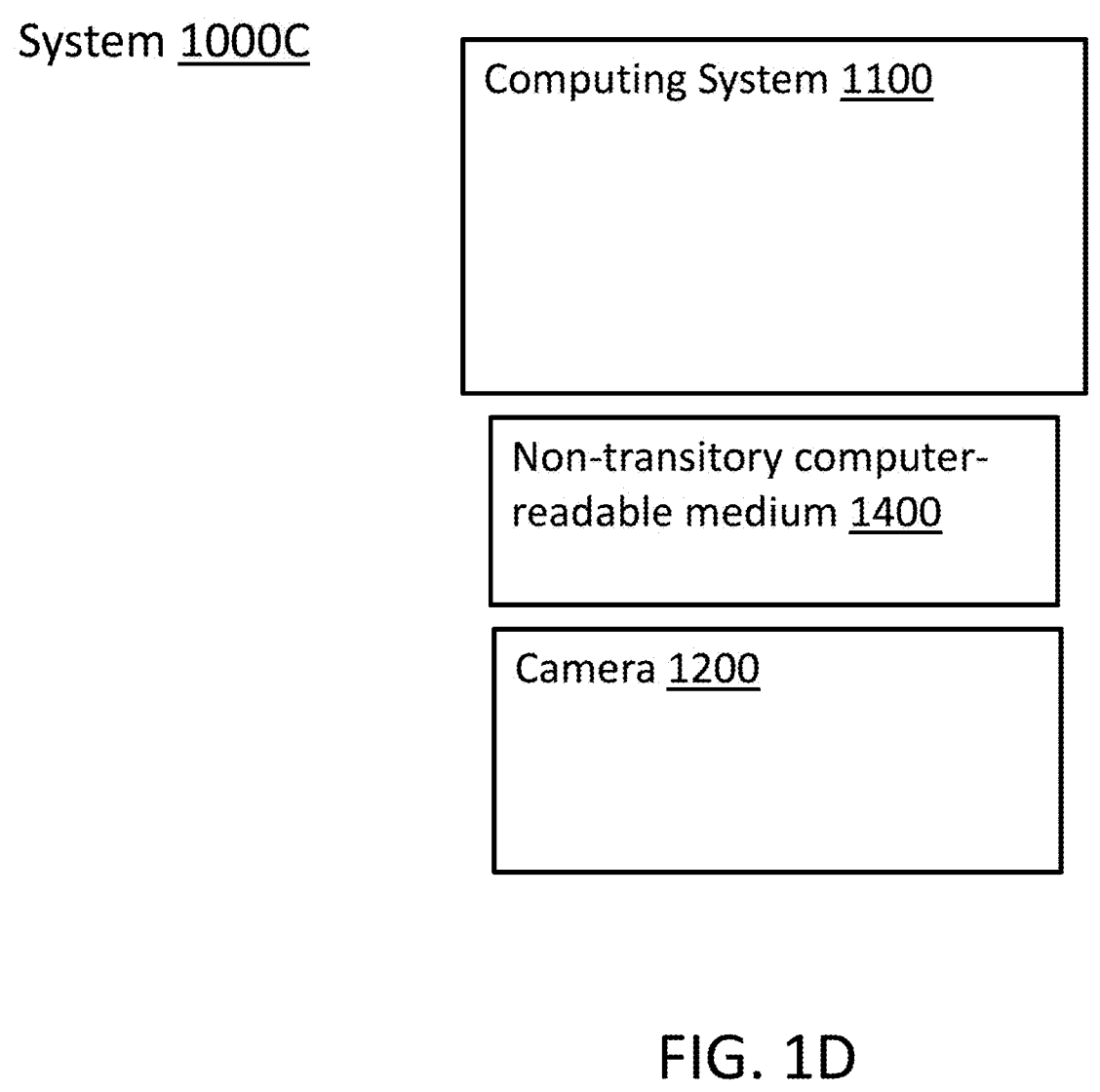

In an embodiment, the computing system 1100 may communicate information directly with the camera 1200 and/or with the robot 1300, or may communicate via an intermediate storage device, or more generally an intermediate non-transitory computer-readable medium. For example, FIG. 1D illustrates a system 1000C, which may be an embodiment of the system 1000/1000A/1000B, that includes a non-transitory computer-readable medium 1400, which may be external to the computing system 1100, and may act as an external buffer or repository for storing, e.g., image information generated by the camera 1200. In such an example, the computing system 1100 may retrieve or otherwise receive the image information from the non-transitory computer-readable medium 1400. Examples of the non-transitory computer readable medium 1400 include an electronic storage device, a magnetic storage device, an optical storage device, an electromagnetic storage device, a semiconductor storage device, or any suitable combination thereof. The non-transitory computer-readable medium may form, e.g., a computer diskette, a hard disk drive (HDD), a solid-state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), and/or a memory stick.

As stated above, the camera 1200 may be a 3D camera and/or a 2D camera. The 2D camera may be configured to generate a 2D image, such as a color image or a grayscale image. The 3D camera may be, e.g., a depth-sensing camera, such as a time-of-flight (TOF) camera or a structured light camera, or any other type of 3D camera. In some cases, the 2D camera and/or 3D camera may include an image sensor, such as a charge coupled devices (CCDs) sensor and/or complementary metal oxide semiconductors (CMOS) sensor. In an embodiment, the 3D camera may include lasers, a LIDAR device, an infrared device, a light/dark sensor, a motion sensor, a microwave detector, an ultrasonic detector, a RADAR detector, or any other device configured to capture depth information or other spatial structure information.

As stated above, the image information may be processed by the computing system 1100. In an embodiment, the computing system 1100 may include or be configured as a server (e.g., having one or more server blades, processors, etc.), a personal computer (e.g., a desktop computer, a laptop computer, etc.), a smartphone, a tablet computing device, and/or other any other computing system. In an embodiment, any or all of the functionality of the computing system 1100 may be performed as part of a cloud computing platform. The computing system 1100 may be a single computing device (e.g., a desktop computer), or may include multiple computing devices.

Figure 2A:
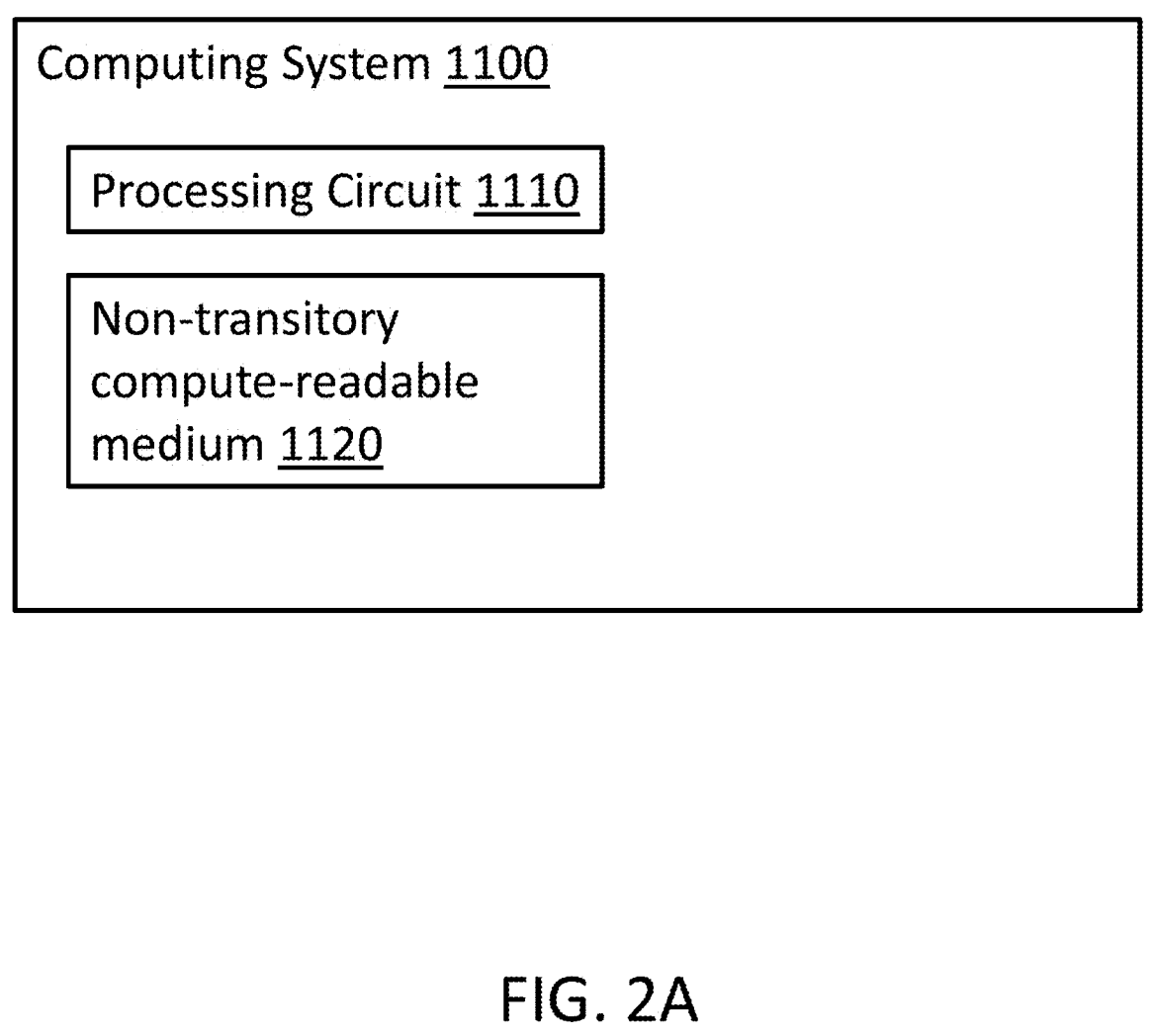

FIG. 2A provides a block diagram that illustrates an embodiment of the computing system 1100. The computing system 1100 in this embodiment includes at least one processing circuit 1110 and a non-transitory computer-readable medium (or media) 1120. In some instances, the processing circuit 1110 may include processors (e.g., central processing units (CPUs), special-purpose computers, and/or onboard servers) configured to execute instructions (e.g., software instructions) stored on the non-transitory computer-readable medium 1120 (e.g., computer memory). In some embodiments, the processors may be included in a separate/stand-alone controller that is operably coupled to the other electronic/electrical devices. The processors may implement the program instructions to control/interface with other devices, thereby causing the computing system 1100 to execute actions, tasks, and/or operations.

In an embodiment, the processing circuit 1110 includes one or more processors, one or more processing cores, a programmable logic controller ("PLC"), an application specific integrated circuit ("ASIC"), a programmable gate array ("PGA"), a field programmable gate array ("FPGA"), any combination thereof, or any other processing circuit.

In an embodiment, the non-transitory computer-readable medium 1120, which is part of the computing system 1100, may be an alternative or addition to the intermediate non-transitory computer-readable medium 1400 discussed above. The non-transitory computer-readable medium 1120 may be a storage device, such as an electronic storage device, a magnetic storage device, an optical storage device, an electromagnetic storage device, a semiconductor storage device, or any suitable combination thereof, for example, such as a computer diskette, a hard disk drive (HDD), a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, any combination thereof, or any other storage device. In some instances, the non-transitory computer-readable medium 1120 may include multiple storage devices. In certain implementations, the non-transitory computer-readable medium 1120 is configured to store image information generated by the camera 1200 and received by the computing system 1100. In some instances, the non-transitory computer-readable medium 1120 may store one or more model templates used for performing an object recognition operation. The non-transitory computer-readable medium 1120 may alternatively or additionally store computer readable program instructions that, when executed by the processing circuit 1110, causes the processing circuit 1110 to perform one or more methodologies described here, such as the operations described with respect to FIG. 4.

FIG. 2B depicts a computing system 1100A that is an embodiment of the computing system 1100 and includes a communication interface 1130. The communication interface 1130 may be configured to, e.g., receive image information generated by the camera 1200 of FIGS. 1A-1D. The image information may be received via the intermediate non-transitory computer-readable medium 1400 or the network discussed above, or via a more direct connection between the camera 1200 and the computing system 1100/1100A. In an embodiment, the communication interface 1130 may be configured to communicate with the robot 1300 of FIG. 1C. If the computing system 1100 is external to a robot control system, the communication interface 1130 of the computing system 1100 may be configured to communicate with the robot control system. The communication interface 1130 may also be referred to as a communication component or communication circuit, and may include, e.g., a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

Figure 2C:
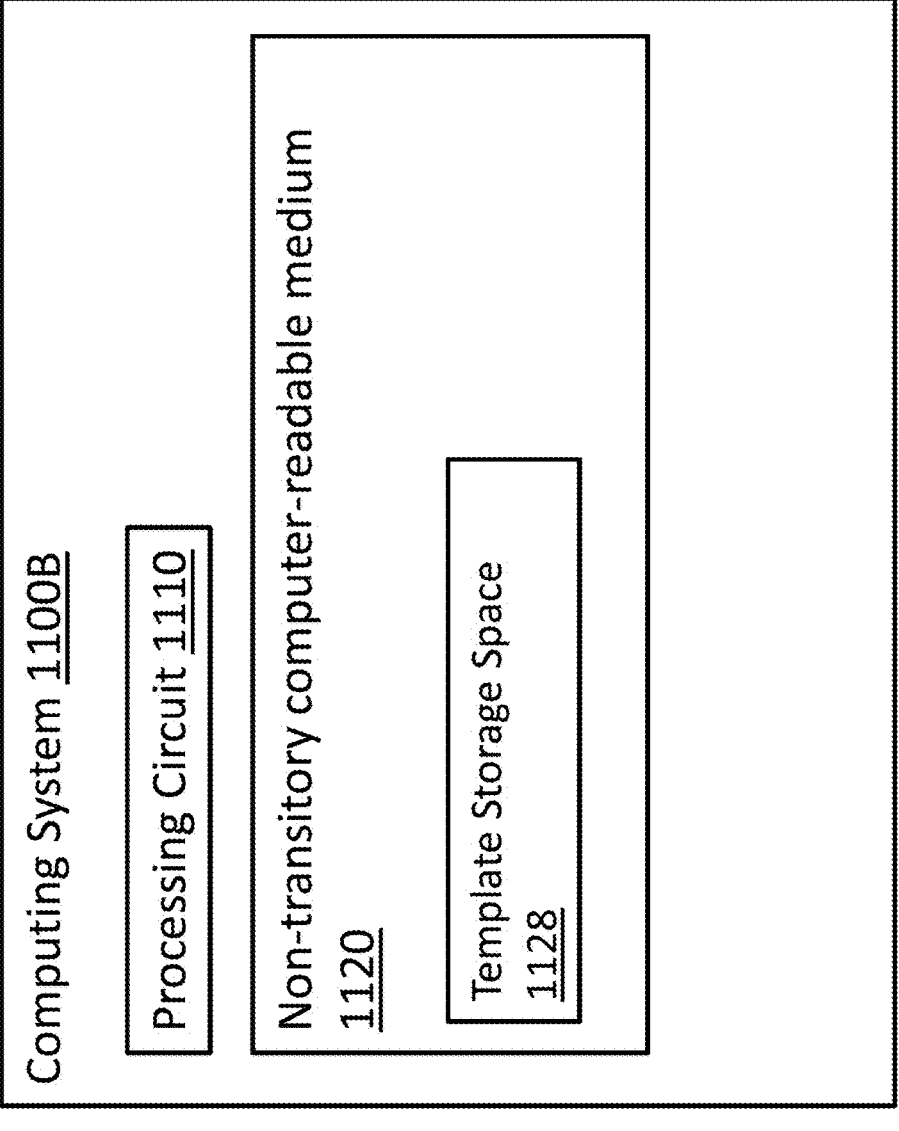

In an embodiment, as depicted in FIG. 2C, the non-transitory computer-readable medium 1120 may include a template storage space 1128 for storing one or more model templates. Each of the one or more model templates may model or otherwise describe an object or group of objects, such as a group of boxes expected or known to have the same appearance and/or the same structure. For example, a particular model template may represent a group of boxes or other objects which have a common logo, picture, or other visual detail printed on one or more outer faces of the boxes. In this example, the group of objects may form a class of objects. In other words, they may have a common object type. In some implementations, the one or more model templates may be generated via an object registration process which is performed on a particular object representative of or belonging to the class of objects or object type. The object registration process may use image information representing the object to generate a model or other description of an appearance and/or structure of the object, wherein the description may be part of a model template for describing the class of objects. In some embodiments, the model template may be associated with a box or other polyhedron, with each model template being further configured to describe the appearance of each specific face (e.g., top, side, bottom, etc.) of the object.

The model templates may then be used by the computing system 1100 for performing template matching, which involves, e.g., comparing image information which represents the appearance of an object in a scene with the model templates in the template storage space 1128 (which may have been generated during object registration or otherwise obtained). For instance, the computing system 1100 may use information gathered through the comparison of the templates and the image information to generate a matching score, as discussed below. Model templates and template matching comparisons are described in further detail in relation to FIG. 4 below.

Figure 2D:
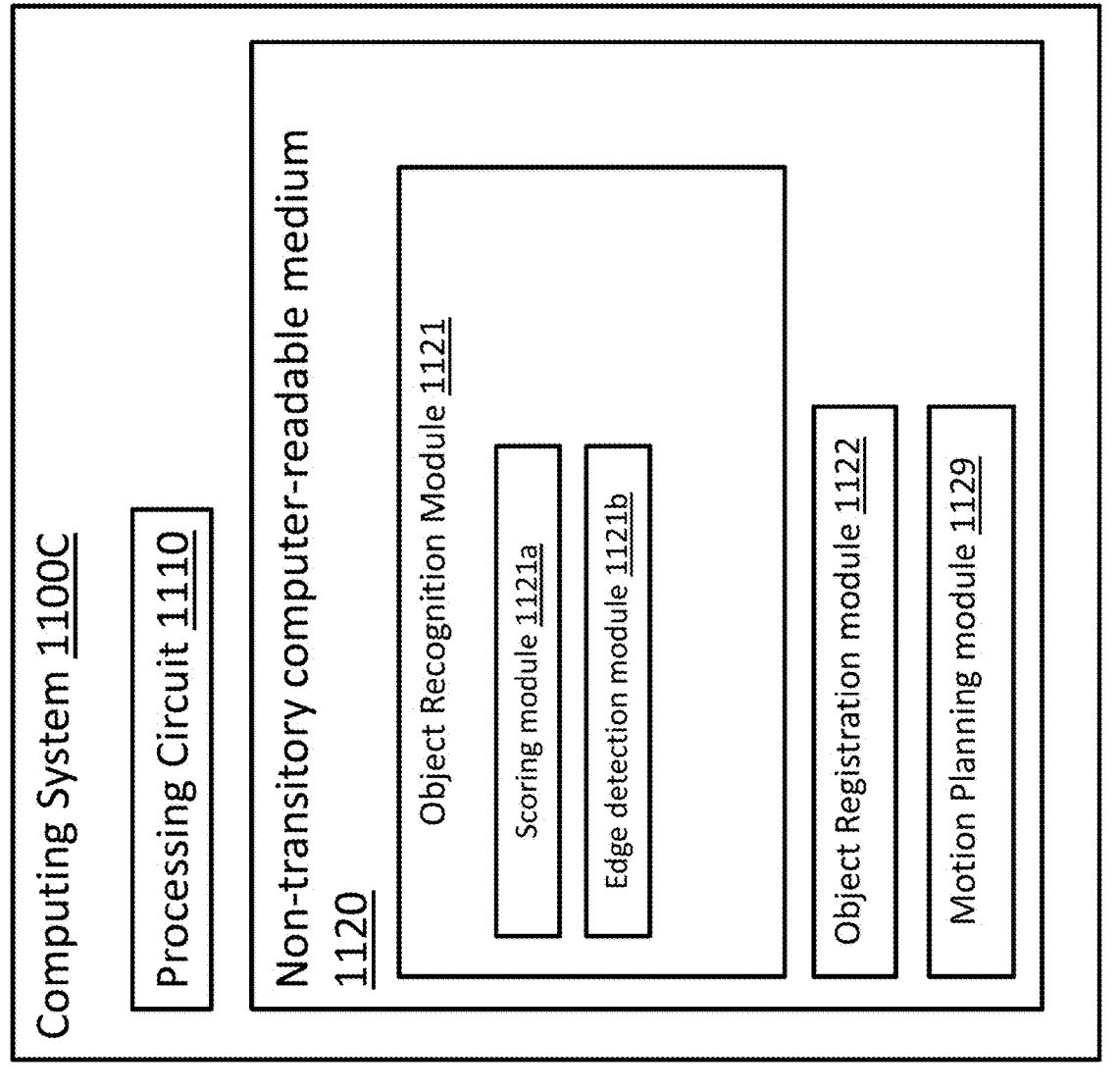

In an embodiment, the processing circuit 1110 may be programmed by one or more computer-readable program instructions stored on the non-transitory computer-readable medium 1120. For example, FIG. 2D illustrates a computing system 1100C, which is an embodiment of the computing system 1100/1100A/1100B, in which the processing circuit 1110 is programmed by one or more modules, including an object recognition module 1121, an object registration module 1122, and a motion planning module 1129.

In an embodiment, the object recognition module 1121 may be configured to determine whether image information matches a model template, or a degree by which the image information matches the model template, as discussed below in more detail. The object recognition module 1121 may include, e.g., a scoring module 1121a and an edge detection module 1121b. For instance, the scoring module 1121a may be configured to generate model template matching scores, such as $R_s$ and $R_b$, which are discussed below with respect to step 4004 of method 4000. The edge detection module 1121b may be configured to generate edge bitmaps, such as $E_{S1}$ and $E_{T1}$, which are discussed below with respect to step 4006 and 4008 of method 4000. The object registration module 1122 may be configured to generate a model template based on an appearance of an object. The model templates generated by the object registration module may be used when performing object recognition by the object recognition module 1121 to determine whether an appearance of another object matches any of the model templates.

The motion planning module 1129 may be configured plan the movement of a robot. For example, the motion planning module 1129 may derive individual placement locations/ orientations, calculate corresponding motion plans, or a combination thereof for placing and/or stacking objects.

In various embodiments, the terms "computer-readable instructions" and "computer-readable program instructions" are used to describe software instructions or computer code configured to carry out various tasks and operations. In various embodiments, the term "module" refers broadly to a collection of software instructions or code configured to cause the processing circuit 1110 to perform one or more functional tasks. The modules and computer-readable instructions may be described as performing various operations or tasks when a processing circuit or other hardware component is executing the modules or computer-readable instructions.

Figure 3A:
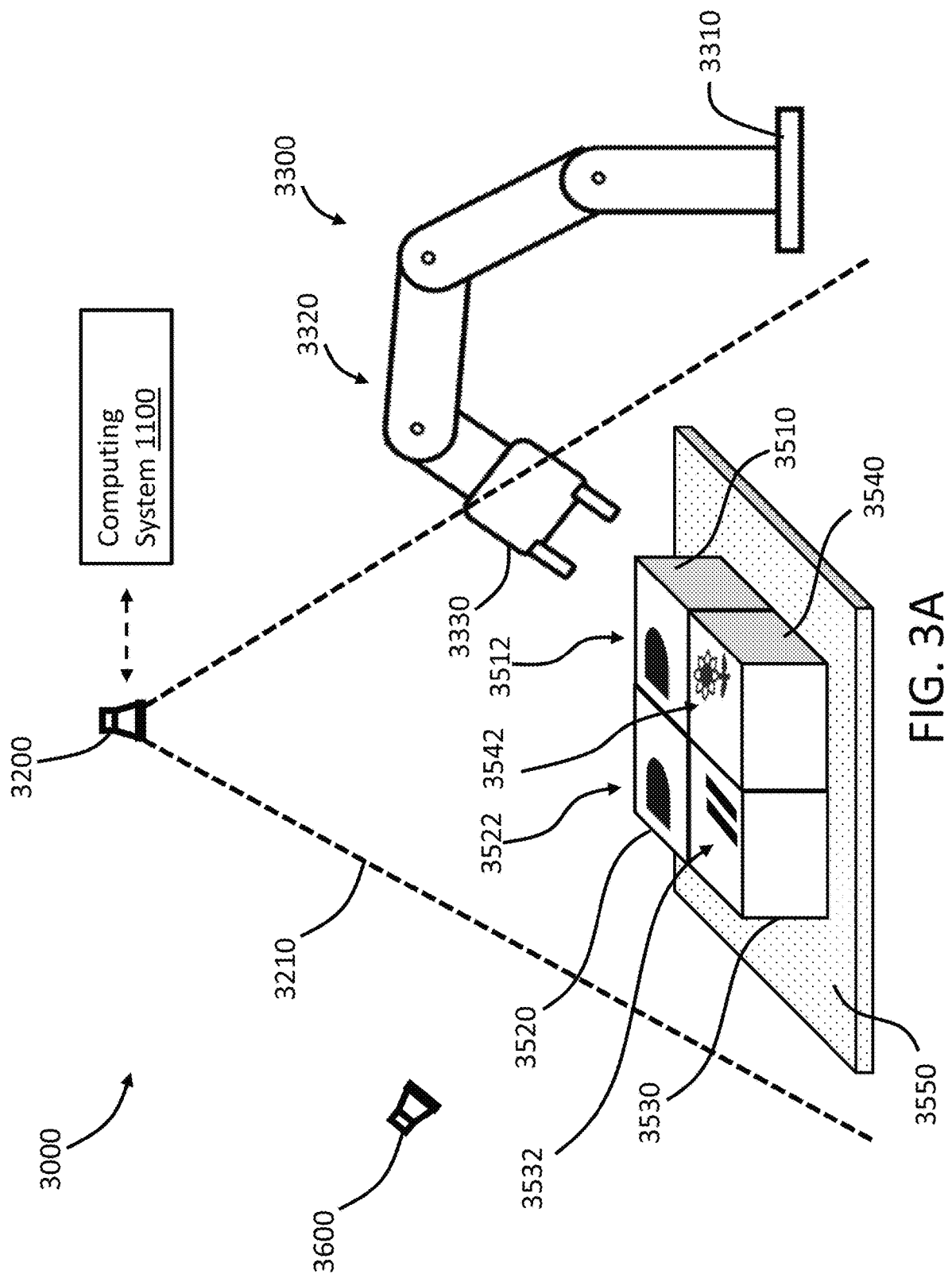
FIGS. 3A-3B illustrate environments in which physical edge detection may be performed, according to embodiments hereof.
Figure 3B:
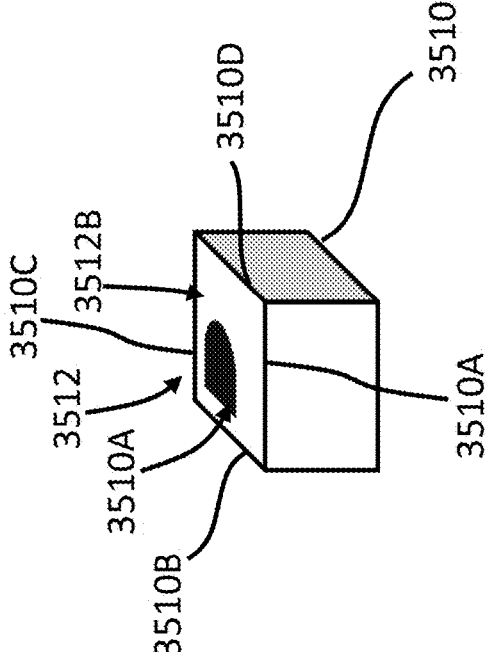

FIGS. 3A and 3B illustrate an example environment in which template matching may be performed. More particularly, FIG. 3A depicts an environment having a system 3000 (which may be an embodiment of the system 1000/1000A/ 1000B/1000C of FIGS. 1A-1D) that includes the computing system 1100, a robot 3300, and a camera 3200. The camera 3200 may be an embodiment of the camera 1200 and may be configured to generate image information which represents a scene in a camera field of view 3210 of the camera 3200, or more specifically represents objects in the camera field of view 3210, such as objects 3510, 3520, 3530, 3540, and 3550. In one example, each of the objects 3510-3540 may be, e.g., a container such as a box or crate, while the object 3550 may be, e.g., a pallet on which the containers are disposed.

In an embodiment, an object in a camera field of view may have visual detail (also referred to as visible detail), such as visual markings, on an outer surface of the object. For example, as illustrated in FIGS. 3A and 3B, the objects 3510, 3520, 3530, 3540 may have visual markings 3512, 3522, 3532, 3542, respectively, printed or otherwise disposed on respective outer surfaces (e.g., top surfaces) of the objects 3510-3540. As an example, a visual marking may include a visible line (e.g., straight line or curved line), a visible shape such as a polygon, a visual pattern, or other visual marking. In some scenarios, a visual marking (e.g., a visible line) may form or be part of a symbol or drawing that appears on an outer surface of an object. The symbol may include, e.g., a logo or written character (e.g., alphanumeric character). In some scenarios, the visual detail on an outer surface of a container or other object may be formed by a contour of a layer of material (e.g., a strip of packing tape or a sheet of mailing label) that is disposed on the outer surface of the container.

In an embodiment, the system 3000 of FIG. 3A may include one or more light sources, such as light source 3600. The light source 3600 may be, e.g., a light emitting diode (LED), a halogen lamp, or any other light source, and may be configured to emit visible light, infrared radiation, or any other form of light toward surfaces of the objects 3510-3550. In some implementations, the computing system 1100 may be configured to communicate with the light source 3600 to control when the light source 3600 is activated. In other implementations, the light source 3600 may operate independently of the computing system 1100.

Figure 5A:
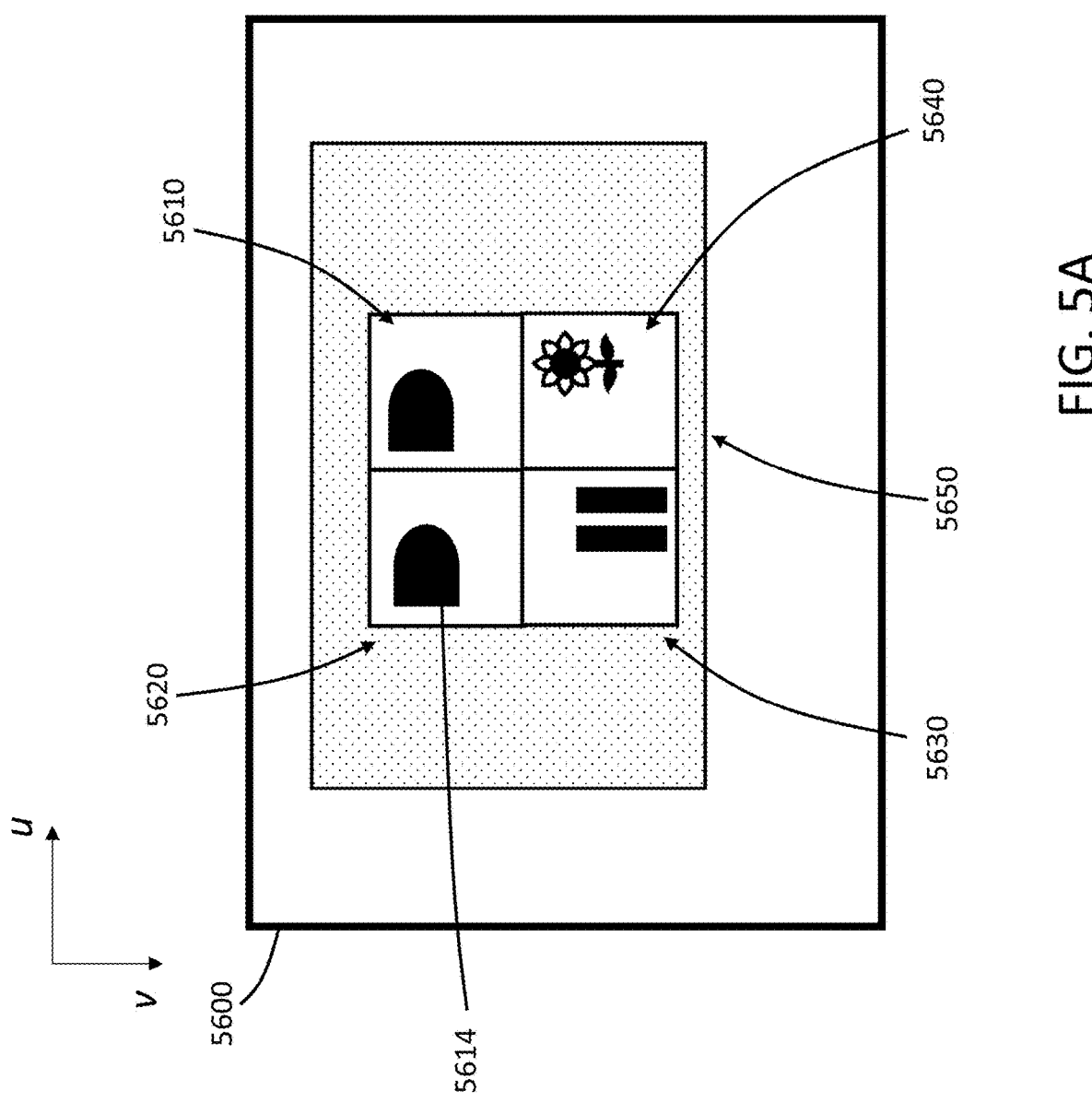
Figure 5B:

In an embodiment, the system 3000 may include multiple cameras, including a 2D camera that is configured to generate 2D image information 5600 and a 3D camera that is configured to generate 3D image information. The 2D image information 5600 (e.g., a color image or a grayscale image)

may describe an appearance of one or more objects, such as the objects 3510-3550, in the camera field of view 3210. For instance, the 2D image information 5600 may capture or otherwise represent visual detail, such as the visual markings 3512-3542 disposed on respective outer surfaces (e.g., top surfaces) of the objects 3510-3540, and/or contours of those outer surfaces. In an embodiment, the 3D image information may describe a structure of one or more of the objects 3510-3550, wherein the structure for an object may also be referred to as an object structure or physical structure for the object. For example, the 3D image information may include a depth map, or more generally include depth information, which may describe respective depth values of various locations in the camera field of view 3210 relative to the camera 3200 or relative to some other reference point. The locations corresponding to the respective depth values may be locations (also referred to as physical locations) on various surfaces in the camera field of view 3210, such as locations on respective top surfaces of the objects 3510-3550. In some instances, the 3D image information may include a point cloud, which may include a plurality of 3D coordinates that describe various locations on one or more outer surfaces of the objects 3510-3550, or of some other objects in the camera field of view 3210. The point cloud is shown in FIG. 5B and will be described in further detail below. An occlusion may be present within the camera field of view 3210, blocking or occluding a portion of the object 3510-3550. In embodiments, the template matching as described herein may involve masking out the occluded portion of the object 3510-3550 during the generation of the 2D image information 5600 or the 3D image information 5700 so as to better facilitate a comparison between the scene and the model template.

In the example of FIG. 3A, the robot 3300 (which may be an embodiment of the robot 1300) may include a robot arm 3320 having one end attached to a robot base 3310 and having another end that is attached to or is formed by an end effector apparatus 3330, such as a robot gripper. The robot base 3310 may be used for mounting the robot arm 3320, while the robot arm 3320, or more specifically the end effector apparatus 3330, may be used to interact with one or more objects (e.g., 3510/3520/3530/3540) in an environment of the robot 3300. The interaction (also referred to as robot interaction) may include, e.g., gripping or otherwise picking up at least one of the objects 3510-3540. For example, the robot interaction may be part of a de-palletization operation in which the robot 3300 is used to pick up the objects 3510-3540 (e.g., boxes) from the object 3550 (e.g., pallet or other platform) and move the objects 3510-3540 to a destination location. Additionally, and as described above, the motion planning module 1129 may be used to plan said movements, rotation, or a combination thereof to place, stack, or move objects.

In an embodiment, the robot 3300 may further include additional sensors configured to obtain information used to implement the tasks, such as for manipulating the structural members and/or for transporting the robotic units. The sensors can include devices configured to detect or measure one or more physical properties of the robot 3300 (e.g., a state, a condition, and/or a location of one or more structural members/joints thereof) and/or of a surrounding environment. Some examples of the sensors can include accelerometers, gyroscopes, force sensors, strain gauges, tactile sensors, torque sensors, position encoders, etc.

As discussed above, one aspect of the present disclosure relates to performing template matching in a manner that considers or emphasizes a contour or edge formed by visual detail (if any) on a surface of an object in the scene. Such a manner of template matching may be referred to as attention-based template matching or edge-based template matching and may yield a higher level of confidence in an ability of the template matching to more accurately indicate when a scene matches a model template than may be achieved in area-based template matching alone.

In embodiments, area-based template matching determines the level of similarity between the model template and the scene. One possible method includes comparing each pixel of the 2D image information 5600 (as shown in FIG. 5A) with each pixel of the model template, this method may be known as pixel-by pixel matching. Other methods such as sampling or other processing techniques may be used to complete the area-based template matching. The area-based template matching process may also be referred to as an area-based comparison. Generally, and described in further detail below, the similarity between the model template and the scene may be used to generate a score based on the similarity of the images.

Edge-based template matching, otherwise known as edge-based matching or attention-based template matching, using visual details on a surface of an object, may also be used for similarity score generation. For example, the 2D image information 5600 and the model template may be compared to generate a score based on the similarity of the position of the edges found within the images. In general, the edges may describe a contour that is formed by a picture, logo, or visual detail in a scene or described by a template. Edge-based template matching may examine whether or how edges that appear in a scene match the edges described by the template. Such an examination or comparison may provide an indication of how much a contour of visual detail in a scene matches a contour of visual details described by a model template. Edge-based template matching may thus place some attention or emphasis on edge-based or line-based matching.

FIG. 4 provides a flow diagram which depicts steps of a method 4000 for performing template matching. In an embodiment, the method 4000 may be performed by, e.g., the computing system 1100 of FIGS. 2A-2D or of FIG. 3A, or more specifically by the at least one processing circuit 1110 of the computing system 1100. In some scenarios, the at least one processing circuit 1110 may perform the method 4000 by executing instructions stored on a non-transitory computer-readable medium (e.g., 1120). For instance, the instructions may cause the processing circuit 1110 to execute one or more of the modules illustrated in FIG. 2D, which may perform method 4000. As an example, one or more of steps 4002-4014 discussed below may be performed by the processing circuit 1110. If the method 4000 involves planning robot interaction or generating a robot interaction movement command 4014, such a step may be performed by, e.g., the robot control system. In an embodiment, the method 4000 may be performed in an environment in which the computing system 1100 is in communication with a robot and a camera, such as the robot 3300 and the camera 3200 in FIG. 3A, or with any other camera or robot discussed in this disclosure. In some scenarios, such as that illustrated in FIG. 3A, the camera (e.g., 3200) may be mounted to a stationary structure (e.g., a ceiling of a room). In other scenarios, the camera may be mounted on the robot arm (e.g., 3320), or more specifically on an end effector apparatus (e.g., 3330) of the robot (e.g., 3300).

In an embodiment, one or more steps of the method 4000 may be performed when a group of objects (e.g., 3510-3550) are currently in a camera field of view (e.g., 3210) of the camera (e.g., 3200). For instance, one or more steps of the method 4000 may be performed immediately after the group of objects are in the camera field of view (e.g., 3210) or, more generally, while the group of objects are in the camera field of view. In some scenarios, the one or more steps of the method 4000 may be performed when the group of objects have been in the camera field of view. For example, when the group of objects are in the camera field of view (e.g., 3210), the camera (e.g., 3200) may generate image information representing the group of objects and may communicate the image information to the computing system (e.g., 1100). The computing system may perform one or more steps of the method 4000 based on the image information, while the group of objects are still in the camera field of view, or even when some or all of the group of objects are no longer in the camera field of view.

In an embodiment, the method 4000 may begin with or otherwise include a step 4002, in which the computing system 1100 obtains image information representing an object in a camera field of view (e.g., 3210) of a camera (e.g., 1200/3200). In some instances, the object may be a first object (e.g., 3510) of one or more objects (e.g., 3510-3540) in the camera field of view 3210 of a camera 1200/3200. The image information 5600, 5700 may be generated by the camera (e.g., 1200/3200) when the group of objects is (or has been) in the camera field of view 3210 and may describe at least an object appearance associated with the first object 3510. The object appearance describes the appearance of the first object 3510 from the viewpoint of the camera 1200/3200. If there are multiple objects (e.g., 3210-3240) in the camera field of view, the camera may generate a first set of image information that represents the multiple objects. In this scenario, the image information obtained in step 4002 for representing a first object (e.g., 3510) of the multiple objects may be a subset or other portion of the first set of image information, as discussed below in more detail. The image information may be generated by the camera (e.g., 1200/3200) when the group of objects is (or has been) in the camera field of view, and may include, e.g., 2D image information and/or 3D image information.

As an example, FIG. 5A depicts a first set of image information, or more specifically, 2D image information 5600, which, as stated above, is generated by the camera 3200 and represents the objects 3510-3550 of FIGS. 3A-3B. More specifically, the 2D image information 5600 may be a grayscale or color image and may describe an appearance of the objects 3510-3550 from a viewpoint of the camera 3200. In an embodiment, the 2D image information 5600 may correspond to a single-color channel (e.g., red, green, or blue color channel) of a color image. If the camera 3200 is disposed above the objects 3510-3550, then the 2D image information 5600 may represent an appearance of respective top surfaces of the objects 3510-3550. In the example of FIG. 5A, the 2D image information 5600 may include respective portions 5610, 5620, 5630, 5640, and 5650, also referred to as image portions, that represent respective surfaces of the objects 3510-3550. In FIG. 5A, each image portion 5610-5650 of the 2D image information 5600 may be an image region, or more specifically a pixel region (if the image is formed by pixels). Each pixel in the pixel region of the 2D image information 5600 may be characterized as having a position that is described by a set of coordinates [U, V] and may have values that are relative to a camera coordinate system, or some other coordinate system, as shown in FIGS. 5A and 5B. Each of the pixels may also have an intensity value, such as a value between 0 and 255 or 0 and 1023. In further embodiments, each of the pixels may include any additional information associated with pixels in various formats (e.g., hue, saturation, intensity, CMYK, RGB, etc.)

As stated above, the image information obtained in step 4002 may in some embodiments be all or a portion of an image, such as the 2D image information 5600. For instance, if the image information obtained in step 4002 represents the first object 3510 of FIG. 3A, then the image information may refer to the image portion 5610. In such an example, the computing system 1100 may be configured to extract the image portion 5610 from the 2D image information 5600 to obtain only the image information associated with the image portion 5610. For instance, the computing system 1100 may extract the image portion 5610 by performing an image segmentation operation based on the 2D image information 5600 and/or 3D image information 5700 illustrated in FIG. 5B. In some implementations, the image segmentation operation may include detecting image locations at which physical edges of objects appear (e.g., edges of a box) in the 2D image information 5600 and using such image locations to identify an image portion (e.g., 5610) that is limited to representing an individual object in a camera field of view (e.g., 3210).

FIG. 5B depicts an example in which the image information obtained in step 4002 is 3D image information 5700. More particularly, the 3D image information 5700 may include, e.g., a depth map or a point cloud that indicates respective depth values of various locations on one or more surfaces (e.g., top surface or other outer surface) of the objects 3510-3550. In some implementations, the image segmentation operation for extracting image information may involve detecting image locations at which physical edges of objects appear (e.g., edges of a box) in the 3D image information 5700 and using such image locations to identify an image portion (e.g., 5710) that is limited to representing an individual object in a camera field of view (e.g., 3210).

The respective depth values may be relative to the camera 3200 which generates the 3D image information 5700 or may be relative to some other reference point. In some embodiments, the 3D image information 5700 may include a point cloud which includes respective coordinates for various locations on structures of objects in the camera field of view (e.g., 3210). In the example of FIG. 5B, the point cloud may include respective sets of coordinates that describe the location of the respective surfaces of the objects 3510-3550. The coordinates may be 3D coordinates, such as [X Y Z] coordinates, and may have values that are relative to a camera coordinate system, or some other coordinate system. For instance, the 3D image information 5700 may include a first portion 5710, also referred to as an image portion, that indicates respective depth values for a set of locations $5710_1$-$5710_n$, which are also referred to as physical locations on a surface of the object 3510. Further, the 3D image information 5700 may further include a second, a third, and a fourth portion 5720, 5730, and 5740. These portions may then further indicate respective depth values for a set of locations, which may be represented by $5720_1$-$5720_n$, $5730_1$-$5730_n$, and $5740_1$-$5740_n$, respectively, corresponding to objects 5620, 5630, and 5640, respectively. A fifth portion 5750, including locations $5750_1$-$5750_n$, may correspond to object 5650. These figures are merely examples, and it is envisioned that any number of objects with corresponding image portions may be used. Similarly to as stated above, the 3D image information 5700 obtained in step 4002 may in some instances be a portion of a first set of 3D image information 5700 generated by the camera. In the example of FIG. 5B, if the 3D image information 5700 obtained in step 4002 represents a first object 3510 of FIG. 3A, then the 3D image information 5700 may be narrowed as to refer to only the image portion 5710.

In an embodiment, an image normalization operation may be performed by the computing system 1100 as part of obtaining the image information in step 4002. The image normalization operation may involve transforming an image or an image portion generated by the camera 3200, so as to generate a transformed image or transformed image portion as part of step 4002. Additionally, the model template may be associated with a specific viewpoint lighting condition, wherein altering the image information may be more conducive to being compared to the model template.

Figure 5C:
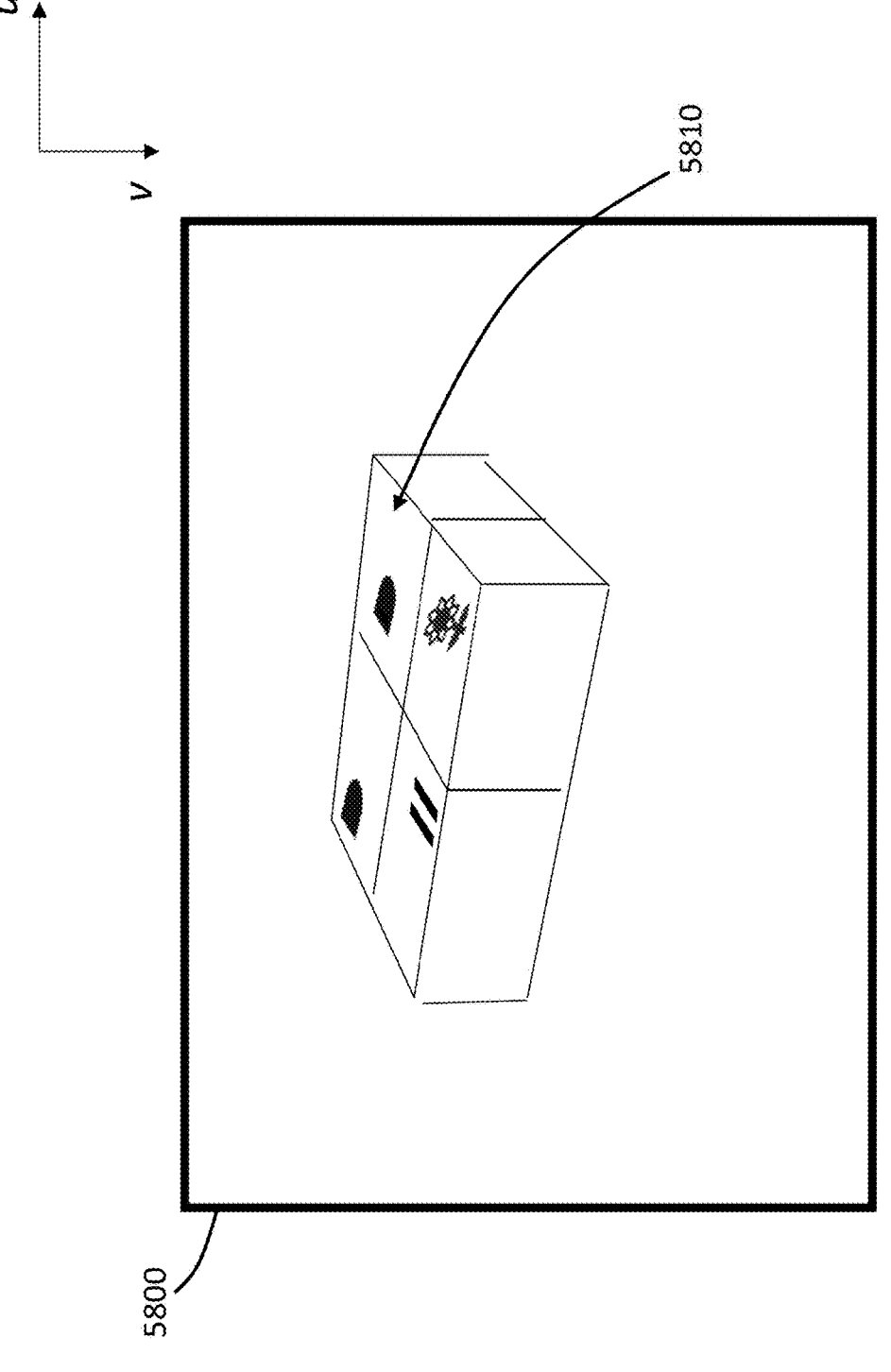

For example, if the image information, which may include the 2D image information 5600, the 3D image information 5700, or a combination of the two, obtained in step 4002 and the visual description information are associated with different object poses (and thus different viewpoints) and/or different lighting conditions, such a difference may reduce an ability for the computing system 1100 to accurately compare the image information of step 4002 and the visual description information. For example, FIG. 5C illustrates an example in which the object 5810 is viewed from an angle other than overhead. In such scenarios, the computing system 1100 may perform an image normalization operation to attempt to cause the image information obtained in step 4002 to more closely match a viewpoint, object pose, lighting condition associated with the visual description information, so as to facilitate a more accurate comparison between the image information and the visual description information. The viewpoint may refer to a pose of an object relative to the camera 3200, and/or an angle at which the camera 3200 is viewing the object when the camera 3200 generates an image representing the object.

For example, the image information may be generated during an object registration operation in which a target object, such as another box which has the same object type as object 3510, is in the camera field of view 3210. The camera 3200 may generate image information that represents the target object when the target object has a specific pose relative to the camera. For instance, the target object may have a pose which causes its top surface to be perpendicular to an optical axis of the camera 3200. In such an example, the image information generated by the camera 3200 may represent a specific viewpoint, such as a top view of the target object. If the image information collected by the camera 3200 is used to generate the image information, then the image information may also represent the viewpoint (e.g., top view) or object pose relative to the camera 3200. In some instances, when the camera 3200 is generating the image information during the object registration operation, the image information may be generated with a particular lighting condition, such as a lighting intensity. In such instances, the image information may represent a particular lighting intensity, lighting color, or other lighting condition.

In an embodiment, the image normalization operation may involve adjusting an image or an image portion of a scene generated by the camera, so as to cause the image or image portion to better match a viewpoint and/or lighting condition associated with visual description information of a model template. The adjustment may involve transforming the image or image portion to generate a transformed image which matches at least one of an object pose or a lighting condition associated with the visual description information of the model template. For instance, FIG. 5D illustrates an image normalization operation in which the computing system 1100 adjusts a particular portion of an object 5810 from a non-head on view to a view from above.

The viewpoint adjustment may involve processing, warping, and/or shifting of the image of the scene so that the image represents the same viewpoint as the visual description information in the model template. Processing, for example, includes altering the color, contrast, or lighting of the image, warping of the scene may include changing the size, dimensions, or proportions of the image, and shifting of the image may include changing the position, orientation, or rotation of the image. In an example embodiment, processing, warping, and or/shifting may be used to alter an object in the image of the scene to have an orientation and/or a size which matches or better corresponds to the visual description information of the model template. If the model template describes a head-on view (e.g., top view) of some object, the image of the scene may be warped so as to also represent a head-on view of an object in the scene.

To explain further, warping may involve determining a homography which defines a warping transformation that transforms the image of the scene from depicting an object in a first pose to depicting the object in a second pose, wherein the second pose matches the pose of an object described by the visual description information of the model template. In some instances, the homography may describe a rotation and/or a warping that matches certain points, for example corners, in the image of the scene to corresponding points, for example corners, in the template. In further embodiments, the orientation, or pose, of the object may be determined by identifying corresponding or other recognizable points in an image of the scene, such as corners of an object. These corresponding points may indicate an angle of the object relative to a camera capturing the scene.

In some instances, while the viewpoint adjustment may involve rotating or warping an image representing a scene, it may omit shifting of the image in a lateral direction, for example along the X or Y axis. Shifting the image in the lateral direction may be performed during a template matching operation. Further, in some implementations, the color adjustment may include adjusting a color of the image of the scene to match or correlate to the color of the template. For instance, in some embodiments, the template image may be in gray scale and the image of the scene can be converted from a color image to a gray scale image to correspond with the template image. In some cases, when converting to gray scale, different colors may result in the same shade of gray, which results in a loss of difference in color from image of the scene. To preserve the differences in colors, a color shift can be applied to the color image of the scene such that the corresponding gray scale image preserves the differences.

The image information obtained in step 4002 may be affected by sources of error, such as noise or glare. In some instances, the source of error may cause the image information to include an artifact, which may be a visual feature in the image information that does not actually appear on an object being represented by the image information. For example, FIG. 5A depicts an artifact 5614, or more specifically a white rectangle, that is described by the image information of step 4002. The artifact 5614 or other sources of error may affect an accuracy of comparison between the image portion and visual description information of a model template, especially if the comparison is done on a region-by-region or area-by-area basis that compares regions or areas of the image to corresponding regions or areas of the model template. In such a case, and as further discussed below, the area-based matching, otherwise known as area-based comparison, may be supplemented through the use of edge-based matching so as to compensate or mitigate the effects of such sources of error. In embodiments, the region or area for comparison (which can also be referred to a comparison unit cell), can be based on a unit distance with respect to the image and/or the model template or based on the pixels of the image and/or the model template.

Step 4004 of method 4000 includes determining a first template matching score (also referred to as an area-based template matching score) indicating a degree of similarity between the image information and the visual description information of the model template. To explain further, each of the model templates includes visual description information that describes an appearance of a model object, with the visual description information including a series of pixels. In one method of comparison, the computing system 1100 may determine a first template matching score using the comparison unit cell based the pixels of the visual description information. More specifically, the first template matching score can be based on a degree of match on a pixel-by-pixel comparison between the visual description information of the model template and the image information. In such a comparison, the computer system 1100 compares the location and intensity of the pixels forming the image information and the pixels forming the visual description information of the model template to determine a first template matching score reflecting the degree of similarity or match, between the pixels of the visual description of the model template and the pixels of the image information. The pixel-by-pixel comparison process describe above is one example of an area based comparison method. Other processes or methods of comparison may also be used to compare the image information and the visual description information of the model template to generate a first template matching score.

Figure 6A:
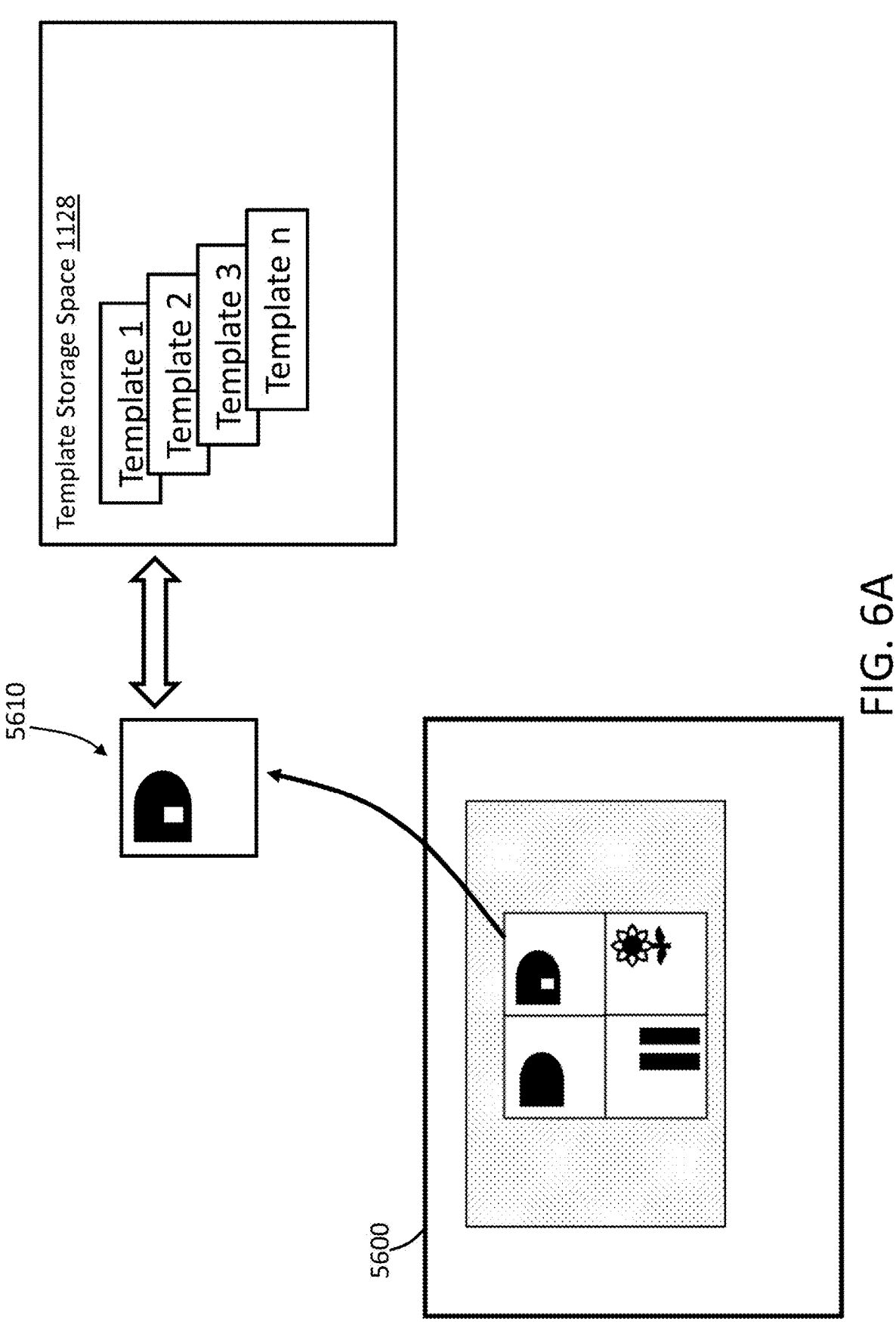
FIG. 6A-6C illustrates an example of image information being compared a plurality of templates, consistent with embodiments hereof.
Figure 6B:
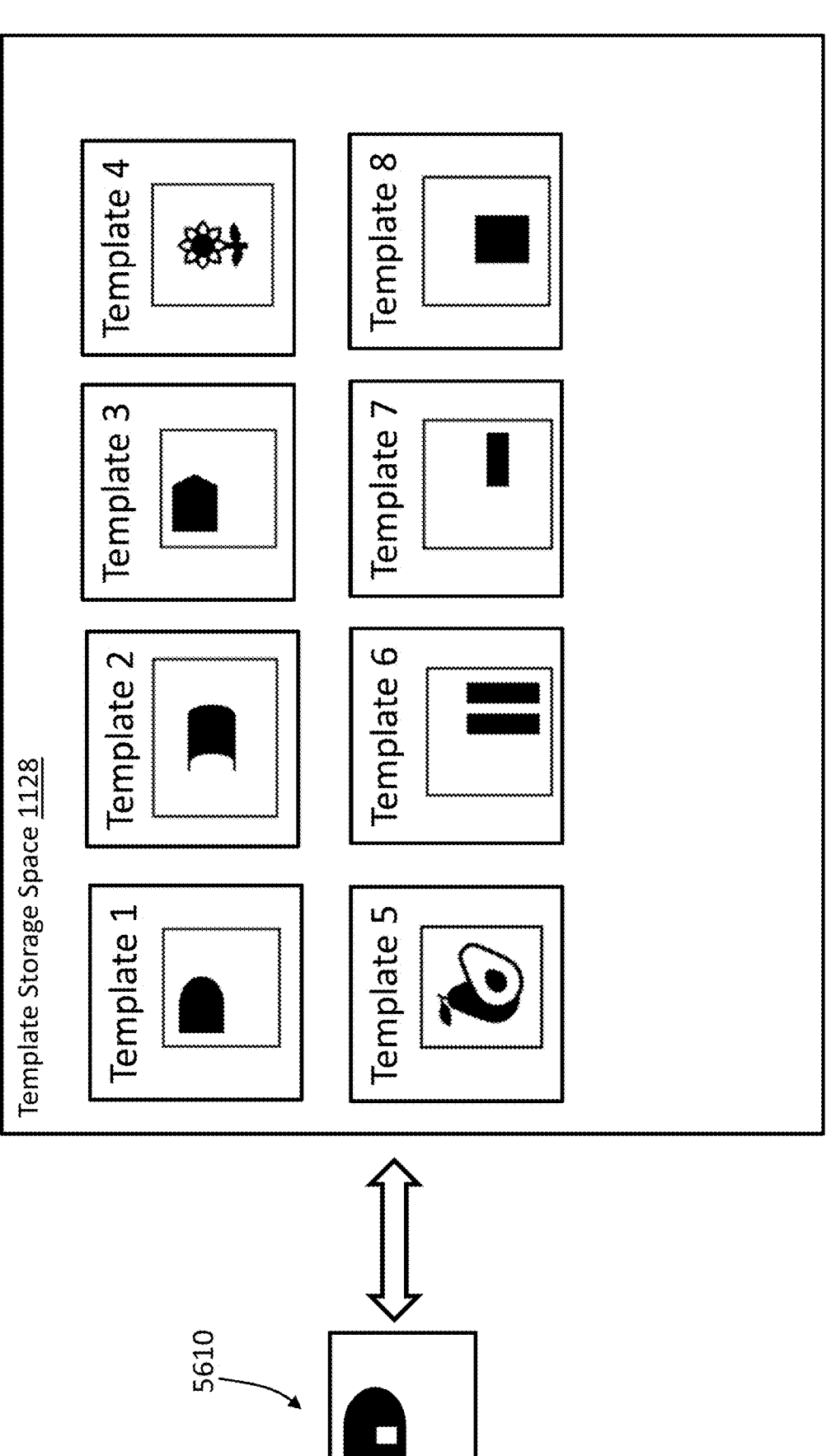

In an example embodiment, as shown in FIG. 6A, the first portion 5610 of the 2D image information 5600 is compared against multiple model templates, for example, model templates 1 through n. Each of the model templates is stored in a template storage space 1128 and reflects a visual description information of a template object. In an example, FIG. 6B depicts a more detailed view in which the first portion 5610 of the 2D image information 5600 is compared against a group of eight model templates located within the template storage space 1128. As discussed previously, each model template includes information representing a specific physical object, for example, containers, e.g. physical containers or boxes, in the form of visual description information. In embodiments, each image portion, for example 5610, may be compared to each of the templates. More specifically, the template matching in step 4004 may involve comparing the 2D image information 5600 or a more specific portion, for example the first portion 5610, with the corresponding area of the model template or vice versa. The comparison may also be referred to as an area-based comparison or an area-based template matching, which examines how an entire area of the 2D image information 5600 matches an area of the model template. Such a comparison may be used to generate a template matching score, such as a template matching score equal to or based on the difference between corresponding regions or portions of the model template and the image information.

An example of a template matching score based on a pixel-by-pixel comparison may be generated using the equation below:

$$D = \sum_{i=1}^{N} f(I_S, I_M)^2$$

In the above equation, the variable D stands for the summed distance (e.g., intensity difference) between each of the pixels between the image information and the visual description information of the template. The value of D may be used to determine the template matching score between the visual description information of the template and the image information. In an embodiment, the process may involve performing a pixel-by-pixel comparison at different scales (e.g. perform a comparison at one scale, and then going to a second scale and refining the comparison), a Fast Fourier Transform operation, a normalized correlation covariance (NCC) analysis, or a different technique.

A first template matching score may be generated using a region or area based comparison. For example, a template matching score using a pixel-by-pixel comparison may be determined using a degree of similarity between pixel values described by the 2D image information 5600 and pixel values described by the visual description information associated with a model template. Additionally, the first template matching score may be based upon the number of pixels within the 2D image information 5600 that satisfy a defined pixel intensity similarity condition when compared to the visual description information of the model template. The first template matching score may be based upon a degree of match between the regions of the image information and the regions of the visual description information. For instance, the computing system 1100 may compare pixels in the image information with the corresponding pixels in the visual description information associated with the template. The pixel-by-pixel comparison discussed herein is an example of an area based comparison method of comparing the 2D image information 5600 and the visual description information associated with a model template. Other methods or processes may be used as well.

Figure 6C:
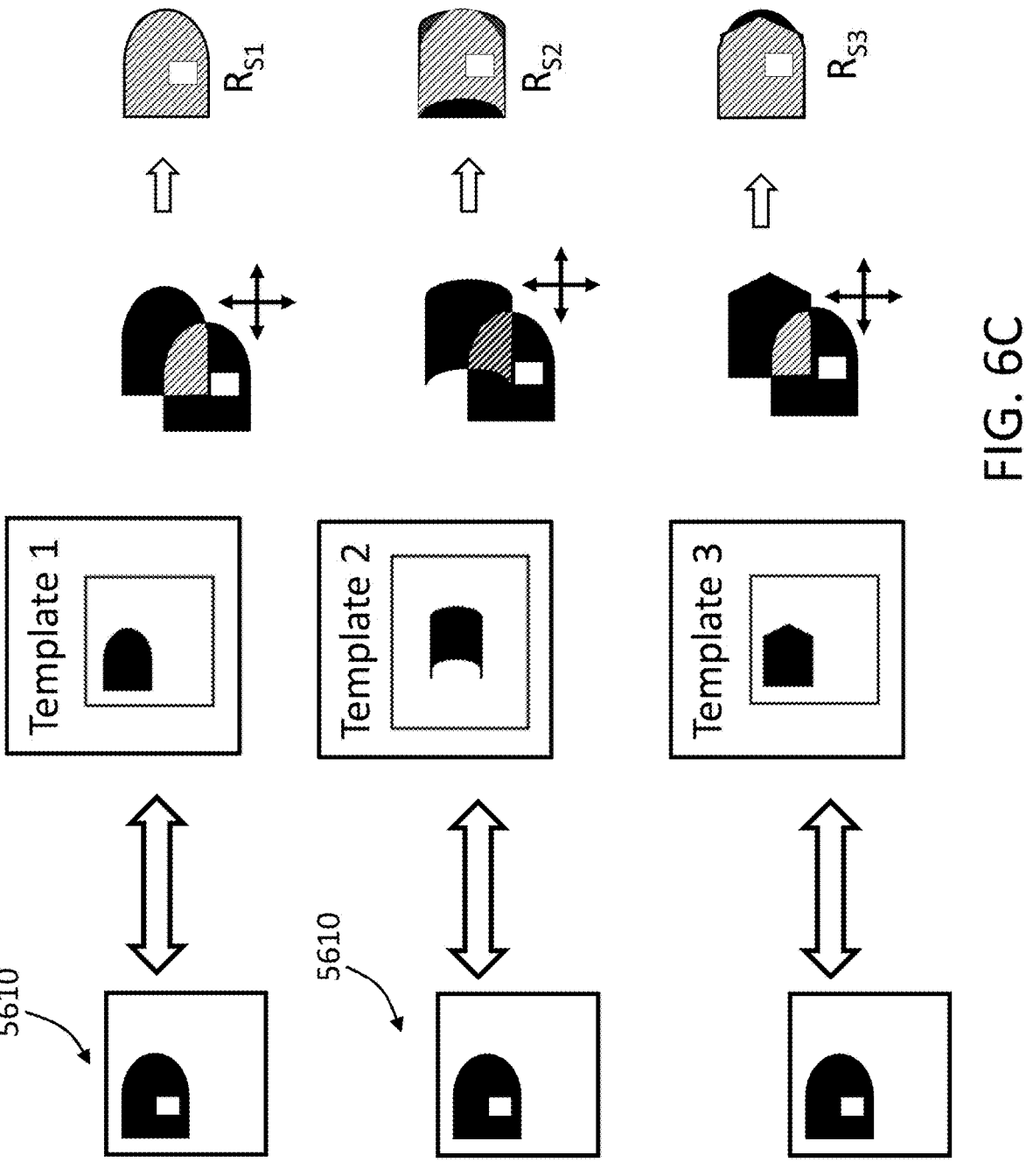

Once a template matching score is generated as described above or using other methods, to provide further comparisons between the 2D image information 5600 and the visual description information of the model template, the template matching procedure may involve shifting the 2D image information 5600 relative to the visual description information of the model template in one or more lateral directions (e.g., X, Y, or u, v) to attempt to maximize an amount of overlay between the features of the visual description information and 2D image information 5600, or more generally, maximize the first template matching score. For example, FIG. 6C illustrates shifting an image portion 5610 of the 2D image information 5600 and the visual description information of various model templates to determine an optimal alignment between the two, and to determine a series of template matching scores, for example, $R_{S1}$, $R_{S2}$, and $R_{S3}$ to determine when the optimal alignment is obtained.

To explain the shifting process further, the computing system 1100 may generate a heat map, wherein each pixel in the heat map is associated with a certain amount of shift in the X direction and a certain amount of shift in the Y direction, and the pixel may be associated with a template matching score. The heat map may indicate how much the model template should be shifted in the one or more lateral directions relative to the scene to maximize the template matching score. For instance, the template matching may involve shifting the visual description information of the model template (e.g., in width dimension and height or length dimension) relative to the attempt to find the maximum template matching score, wherein the maximum score may represent a maximum area of overlay between the 2D image information 5600 and the visual description information of a selected model template. For example, a template may be shifted up, down, to the right, and/or to the left relative to an image of the scene to increase a template matching score, the template matching in such embodiments attempts to find an appropriate shift as to yield a maximum template matching score, reflecting a maximum amount of overlap be. Alternatively, the 2D image information 5600 may be shifted relative to the model template. Shifting the image portion 5610 of the 2D image information 5600 relative to the visual description information of various model templates may minimize and help account for modeling inaccuracies or noise.

The method 4000 further includes steps 4006-4010, which identify edges within the image information, identify edges within the visual description information of the model template and compares the identified edges within both sets of information. The compared images may be used to create a second template matching score based on the similarity of the image information and the visual description information of the model template. To explain further, step 4006 identifies edges within the image information, known as image edge information, which represents a physical object such as a box or container, and step 4008 identifies edges within the visual description information of a chosen model template, known as template edge information. The edges identified in step 4006 and step 4008 are then compared in step 4010 to determine a second template matching score based on the similarity of the image edge information and the template edge information. Each step is explained in further detail below.

Step 4006 of method 4000 includes determining image edge information based on the image information representing a physical object or a portion of a physical object. More specifically, the computing system 1100, identifies a first set of one or more edges detected within the image information, and, in some cases, may identify that no edge is present in the image information. The image edge information may be determined with the intent of comparing the location and number of edges found in the image information with the location and number of edges found in the visual description information of a selected template. To detect any edges present, the computing system 1100 may use a variety of methods, including (i) satisfying a defined pixel intensity discontinuity condition or a defined spiked pixel intensity condition at the edge, (ii) satisfying a defined depth discontinuity condition at the edge, or (iii) satisfying a defined orientation discontinuity condition at the edge. To explain further, satisfying a defined pixel intensity discontinuity condition may include using changes in pixel intensity values, or more specifically, a derivative or gradient in pixel intensity values between regions having varying pixel intensities. The gradient or derivative may then be used to detect a spike in pixel intensity that is present at an edge, particularly when moving perpendicular to an edge. Additionally, the computing system 1100 may apply a binary threshold to identify differences in pixel intensity, so as to define a spike or discontinuity between adjacent pixels, identifying an edge. Further, in addition to or alternatively to the previously described method, the edges may be detected using changes in visual texture, depth discontinuity, and/or from inconsistencies in the normal vector of the surfaces found in the template (an orientation discontinuity).

Figure 7A:
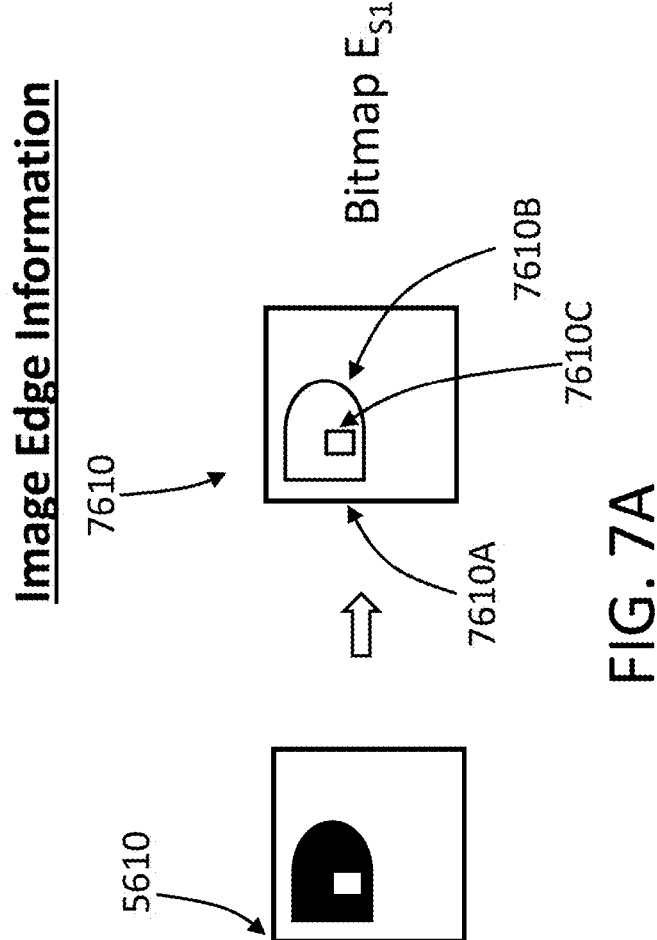
FIG. 7A-7B illustrates an example of determining an edge bitmap which identifies edges and area regions, consistent with embodiments hereof.
Figure 7B:
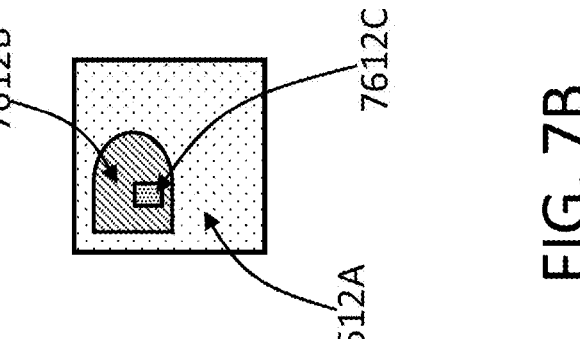

If a first set of one or more edges is detected in the image information, the computing system 1100 generates a first edge bitmap which contains identifying information as to where the first set of one or more edges is located. The first edge bitmap may additionally include area pixels that include non-edge pixels, pixels not identified as edge pixels, as well as edge pixels in some embodiments. FIG. 7A illustrates an example of the computing system 1100 determining an edge bitmap $E_{S1}$ 7610 based on an image portion 5610 associated with the first object 3510. As shown, the edge bitmap $E_{S1}$ 7610 identifies a first set of edges 7610A-7610C, as well as area pixel regions 7612A, 7612B, and 7612C (shown in FIG. 7B) of the image portion 5610.

To further explain how edges and area pixel regions are represented within the image information, the computing system 1100 generates an edge bitmap $E_s$ which represents whether an edge or non-edge region is present at each pixel. For instance, each of the edge bitmaps may be a binary bitmap, in which each pixel can have either a value (e.g., 1 or 255) to represent presence of an edge at a location corresponding to that pixel, or another value (e.g., 0) to represent absence of an edge at that location. In addition, the computing system 1100 may assign different levels of importance to different sources of edges (e.g., visual texture, depth discontinuity, normal discontinuity). To assign different levels of importance, the computing system 1100 may increase the thickness of the edges for that source in the binary bitmap.

As stated above, the comparison between the edges of the image information and the edges of the selected template are used to create a second template matching score which may then be used to supplement the information gained by the first template matching score. For example, a physical object, for example object 3510, may have some physical damage which alters the object's appearance, making it difficult to compare the image information with the visual description information of a chosen model template on a strict area-based comparison. In such an example, the scene may have a region or area of pixels (corresponding to the damaged portion of the object) that does not match the model template, and this unmatched region or area may contribute to a determination that the scene does not match the model template, even though the scene does in fact depict an object that is associated with the same group of objects represented by the model template. In another example, the pixel-by-pixel template matching may be affected by pixels in the scene which match pixels in the model template merely out of coincidence, which may contribute to the likelihood of a false positive match between the 2D image information 5600 and a model template. Further, the use of pixel-by-pixel comparison between the visual description information and the model template may be affected by imaging noise and other environmental conditions. Additionally, the visual description information and the template may include areas of uniform color or intensity. In such a case, the pixel-by-pixel comparison may improperly match such areas, leading to an inaccurate matching score. Thus, the present disclosure provides means of combining area-based template matching with edge-based template matching, which may provide a template matching result with more reliability and/or accuracy compared to only using one method or another.

To address potential inaccuracies associated with the area-based comparison, the method 4000 further includes a step 4008 that determines template edge information based on the visual description information of the model template. More specifically, the step 4008 identifies a set of one or more edges detected from the visual description information or, in some cases, identifies that no edge is present in the visual description information. Similarly to step 4006, to determine template edge information, the computing system 1100 identifies a second set of one or more edges detected within the visual description information. The template edge information may be determined with the intent of comparing the location and number of edges found in the visual description information of the model template with the location and number of edges found in the image information. In some cases, the computing system 1100 may identify that no edge is present in the visual description information. To detect any edges present, the computing system 1100 may use a variety of methods, including (i) satisfying a defined pixel intensity discontinuity condition or a defined spiked pixel intensity condition at the edge, (ii) satisfying a defined depth discontinuity condition at the edge, or (iii) satisfying a defined orientation discontinuity condition at the edge. The computing system 1100 may identify a pixel intensity discontinuity using changes in pixel intensity values, or more specifically, a derivative or gradient in pixel intensity values between regions having varying pixel intensities. The gradient or derivate may then be used to detect a spike in pixel intensity that is present at an edge, particularly when moving perpendicular to an edge. Additionally, the computing system 1100 may apply a binary threshold to identify differences in pixel intensity, so as to define a spike or discontinuity between adjacent pixels, identifying an edge. Further, in addition to or alternatively to the previously described method, the edges may be detected using changes in visual texture, depth discontinuity, and/or from inconsistencies in the normal vector of the surfaces found in the template (orientation discontinuities). Alternatively, in embodiments, template edge information associated with the visual description information may be pre-programed, predetermined, or pre-computed and stored, rather than identified during the template matching process.

Figure 8A:
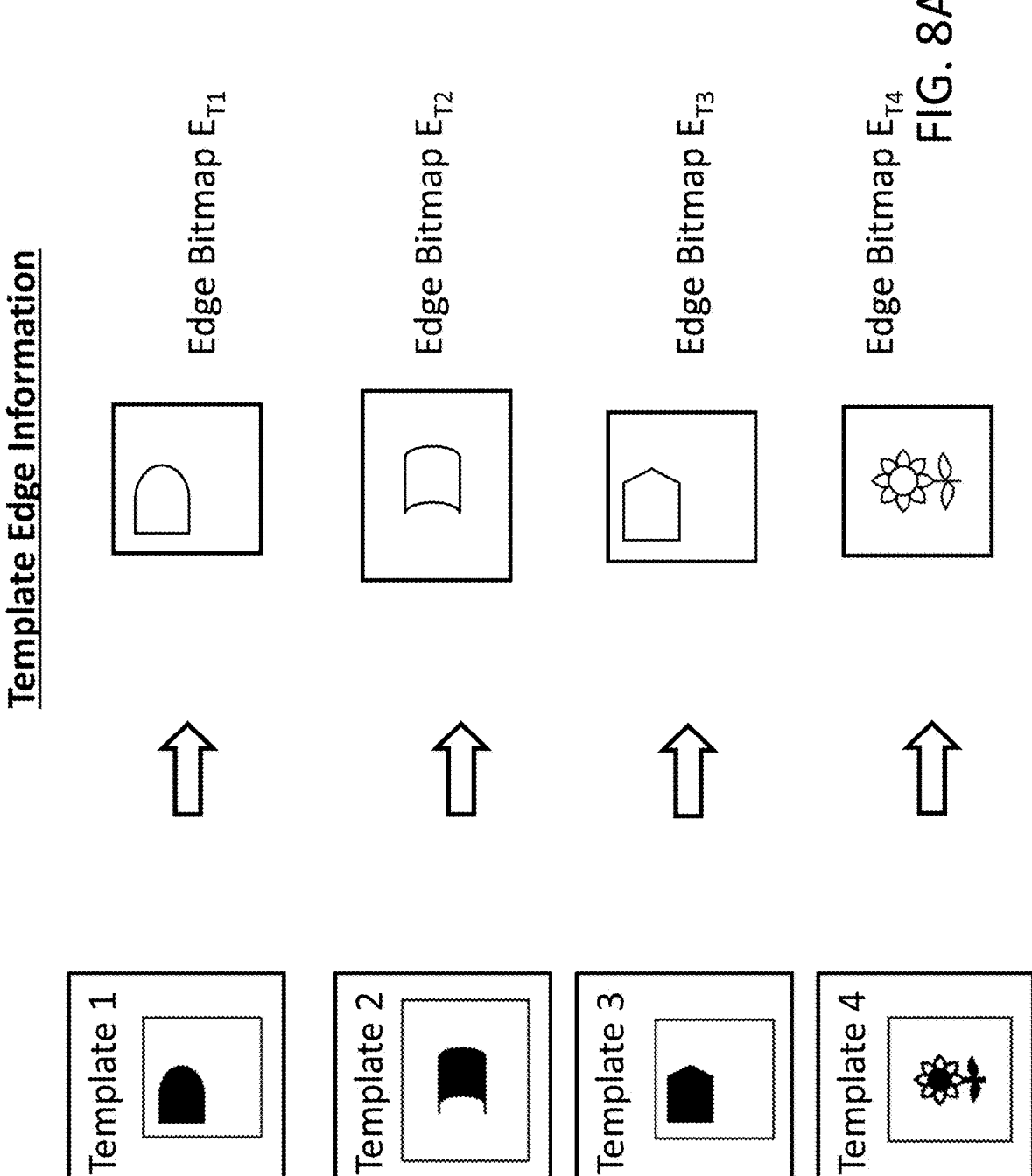
FIGS. 8A-8B illustrates various example template edge bitmaps ET1 through ET8, consistent with embodiments hereof.
Figure 8B:
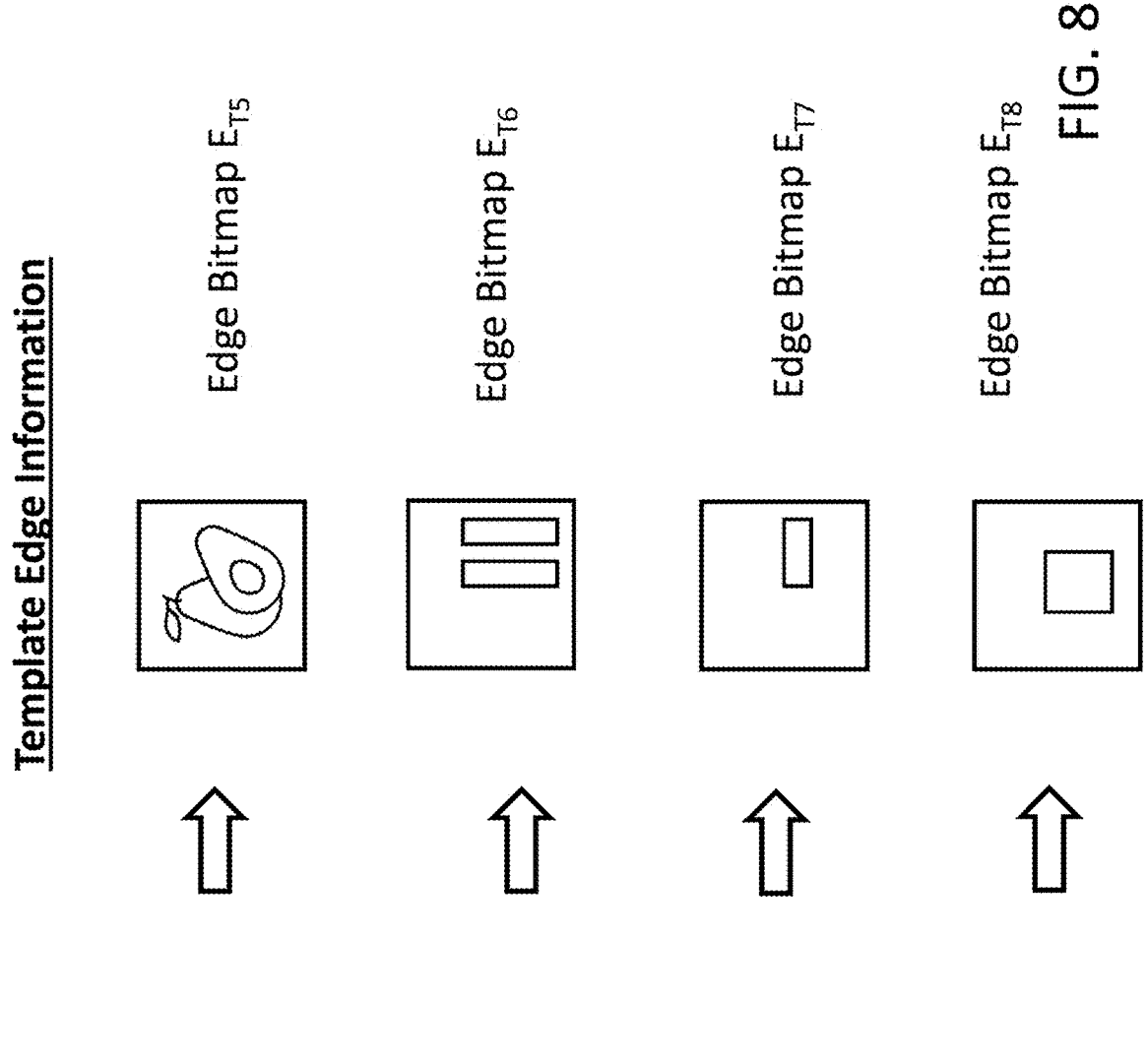

Using the second set of one or more edges detected (e.g., from the visual description information), the computing system 1100 may generate a second edge bitmap that identifies where the second set of one or more edges is located. The second edge bitmap may additionally include area pixels that include non-edge pixels, pixels not identified as edge pixels, as well as edge pixels in some embodiments. The second edge bitmap may be a binary bitmap, which may have at least area pixels, which, as previously discussed, may include edge pixels, non-edge pixels, or any combination of edge and non-edge pixels. Further, area pixels of the binary bitmap are assigned a first pixel value (e.g., 0), while a second pixel value (e.g., 1 or 255) is assigned to the binary bitmap where edges are found. More specifically, the edge pixels, denoted, e.g., with a 1 or 255, are pixels thereof that correspond to locations in the visual description information of the model template at which the second set of one or more edges is detected. FIGS. 8A and 8B provide several example embodiments of bitmaps (ET1 through ET8) associated with templates 1 through 8.

Once the image edge information and the template edge information are determined in steps 4006 and 4008, step 4010 is used to determine a second template matching score based on a comparison between the image edge information and the template edge information. The second template matching score may be part of a template matching technique that looks at the edges in an image and the edges described by the template and may be referred to as edge-based template matching.

The edge-based template matching may create a higher level of confidence in the ability of the template matching score to accurately indicate when the image information matches the visual description information of the model template. The edges may describe physical edges of objects, or, in some cases, the edges may describe a contour that is formed by a picture, logo, or visual detail in a scene or described by a template. The edge-based template matching examines the similarity of edges that appear in the scene and the edges that appear in the selected template. Such an examination or comparison may provide an indication of how much a contour of visual detail in a scene matches may place attention on edge-based or line-based matching, in addition to the area-based pixel-by-pixel template matching discussed above. In some embodiments, a contour in a scene or in a template may be described by one or more edges which appear in the scene or in the template.

Figure 9A:
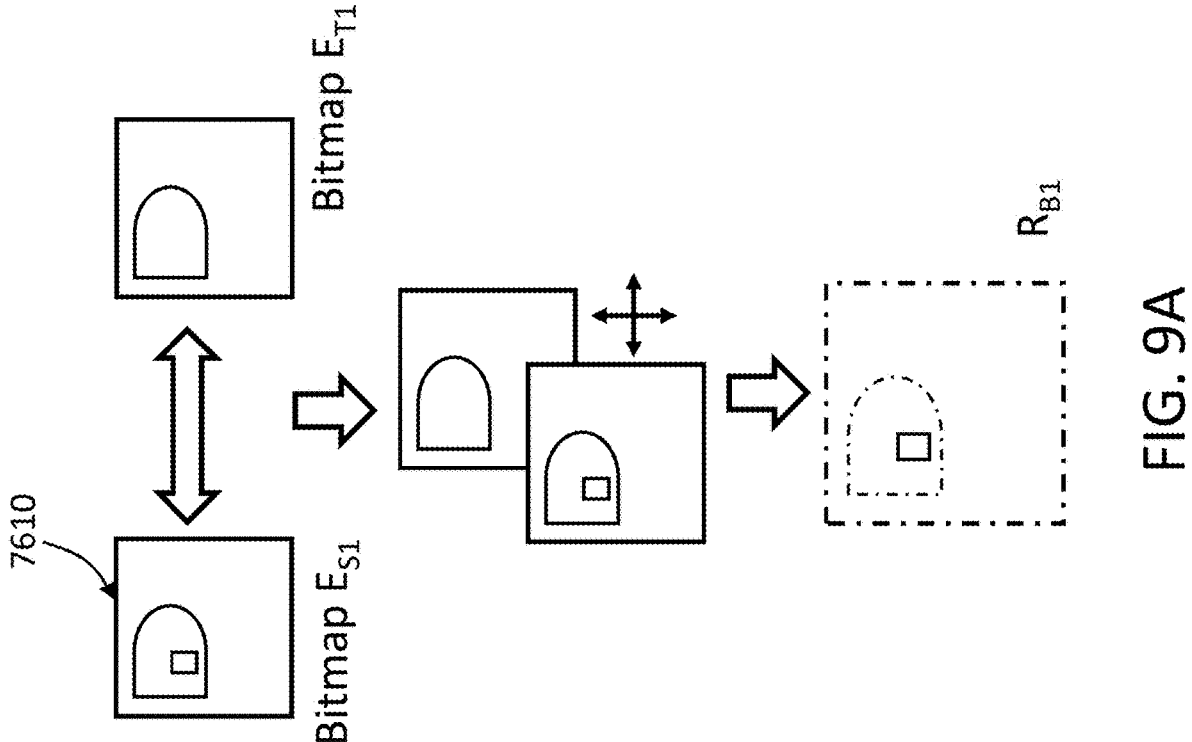
FIGS. 9A-9C illustrates an edge bitmap being compared with edge bitmaps of a plurality of templates, consistent with embodiments hereof.
Figure 9B:
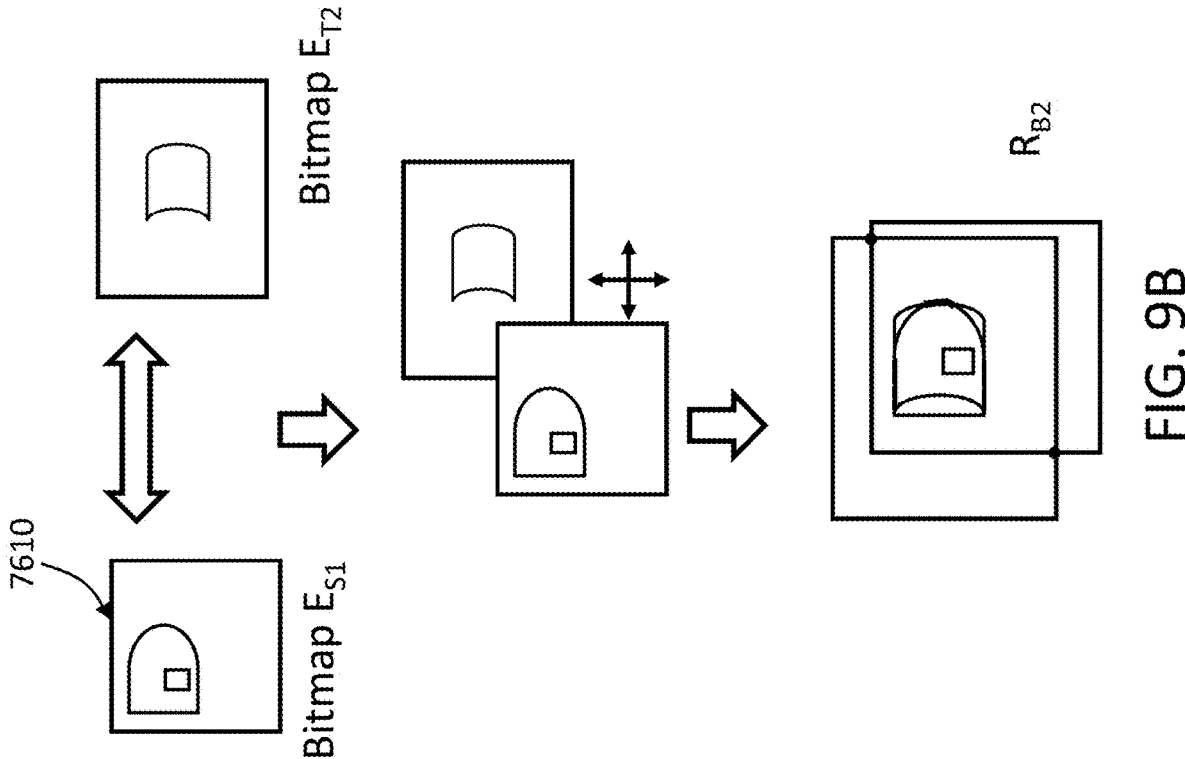
Figure 9C:
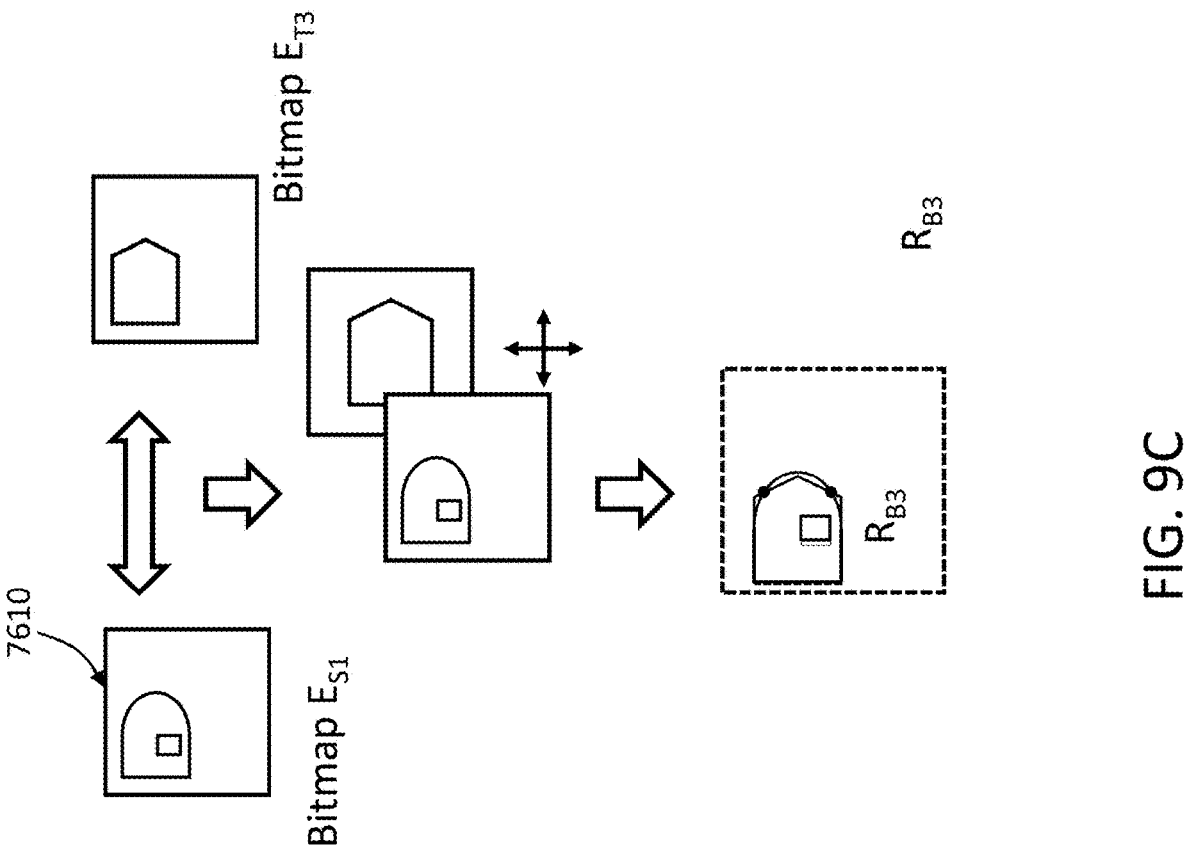

FIGS. 9A-9C provide further detail related to the edge-based template matching. FIGS. 9A-9C depict an edge bitmap $E_{S1}$ being compared with edge bitmaps $E_{T1}$ through $E_{T3}$. By comparing the location of the edges and pixel area regions, the computing system 1100 may generate a second template matching score which describes the level of similarity between the image edge information and each of the templates. The edge-based template matching operation places a greater emphasis on how the contours of the image information matches the contours of the visual description of the model template, as opposed to the area-based template matching. In particular, the second template matching score is focused on determining a maximum amount by which the first set of one or more edges detected from the image information is able to overlap with the second set of one or more edges detected from the visual description information of the model template. Due to the increased focus on the location and number of edges, an edge-based matching comparison is able to minimize differences between the image information and the visual description information of the model template such as shading, color, or lighting.

To provide further comparisons between the image edge information and the template edge information, the edge-based matching procedure may involve shifting the image edge information relative to the template edge information in one or more lateral directions (e.g., X, Y, or u, v) to attempt to maximize an amount of overlay between the first set of edges detected from the image information and the second set of edges detected from the visual description information of the model template.

To provide further comparisons between the image information and the visual description information of the model template, the template matching procedure may involve shifting the image information relative to the visual description information of the model template in one or more lateral directions (e.g., X, Y, or u, v) to attempt to maximize an amount of overlay between the features of the visual description information and the image information, or more generally, maximize the first template matching score. For instance, the edge-based template matching may involve shifting the template edge information (e.g., in width dimension and height or length dimension) relative to the attempt to find the maximum template matching score, wherein the maximum score may represent a maximum area of edge overlay between the image information and the visual description information of a selected model template. For example, the template edge information may be shifted up, down, to the right and/or to the left relative to the image edge information to increase an edge-based template matching score, the template matching in such embodiments attempts to find an appropriate shift as to yield a maximum second matching score, reflecting a maximum amount of overlap be. Alternatively, the image information may be shifted relative to the template. Shifting the image edge information relative to the template edge information may minimize and help account for modeling inaccuracies or noise.

The second template matching score (also referred to as an edge matching score) is expressed as the variable $R_b$, with the value of $R_b$ being higher when the computing system 1100 detects a greater level of match between the image edge information and the template edge information, and lower when the computing system 1100 detects a low level of match between the image edge information and the template edge information. The template matching score $R_b$ reflects the number of points (for example, as measured by a percentage of matching pixels) at which the contour of the image of the scene matches the contour described by the template. Similarly, the edge matching operation may decrease or otherwise penalize the $R_b$ score based on portions of one contour (e.g., contour of visual detail in the scene) that fails to be matched by the other contour (e.g., contour of visual detail of the template).

Similarly to the pixel-by-pixel analysis area-based template matching, the image edge information and the template edge information may not be aligned sufficiently to provide an accurate comparison between the first set of one or more edges detected and the second set of one or more edges detected. Therefore, to increase the accuracy of the comparison, the computing system 1100 may shift the first bitmap of the image edge information relative to the second bitmap of the template edge information, or vice versa, in one or more lateral directions to try and maximize the number of points at which the first bitmap matches the second bitmap. Additionally, the edge matching operation may ignore or disregard pixels that represent an empty area or an area between the edges, to reduce the effect of noise, differences in lighting conditions, or other inconsistencies between the image information and the visual description information of the model template. The edge-based matching operation may focus on pixels which represent a presence of an edge when determining the score $R_b$. Thus, the edge matching operation may focus on aligning a contour represented by the first bitmap with a contour represented by the second bitmap, rather than concern area-based template matching.

In an embodiment, the computing system 1100 may determine, for each edge of the first set of one or more edges, a respective priority level for the edge based on a technique by which the edge is detected from the image information. In such an embodiment, the second template matching score is based on one or more respective priority levels associated with the first set of one or more edges. Further, the computing system 1100 determines a respective priority level for each edge of the first set of one or more edges based on which one of the following techniques is used to detect the edge: (i) satisfying a defined pixel intensity discontinuity condition or a defined spiked pixel intensity condition at the edge, (ii) satisfying a defined a depth discontinuity condition at the edge, or (iii) satisfying a defined orientation discontinuity condition at the edge. Further, the computing system 1100 may determine the second template matching score based on one or more respective thickness values of the set of one or more bands. By doing so, the second template matching score may reflect or take into account a priority level of a band.

Further, the edge-based template matching operation may be configured for specific situations. For example, instead of focusing on the physical edges of an object, the attention or focus may be placed on visual features within the image information and the model template. In such an embodiment, attention is placed on the contour of the visual details of the visual feature by placing additional weight on those edges that may be associated with the visual feature. In an example, the edge-based matching may be used to identify a logo, decal, or other visual feature of interest present within the image information. The identified logo, decal, or other visual feature may then be compared against logos, decals, or other visual features identified within the visual description information of the model template. Therefore, in this embodiment, the second template matching score is based on the similarity of the visual details between the object and the template instead of the actual physical edges.

Once a first template matching score and a second template matching score are determined, step 4012 includes using the computing system 1100 to calculate an overall template matching score which incorporates the first template matching score and the second template matching score. More specifically, the overall template matching score is determined as or based on a weighted combination of the first template matching score and the second template matching score.

As stated above, area-based template matching may have limitations in terms of reliability. For instance, the physical object represented with the image information may be damaged, undesired noise could be presented within the image information, lighting conditions could vary between the image information and the model template, or any other undesired inconsistences could be present, all of which may yield a sufficiently low template matching score. Alternatively, area-based matching may yield an improperly high matching score, as the physical object represented by the image information may differ from the physical object represented by the model template, however, large areas of the two physical objects may still overlap. To explain generally, area-based template matching places equal importance on all regions and features of the image information. Therefore, when combining the first matching score with the second matching score in step 4012, there may be an interest in placing more emphasis on either the first matching score or the second matching score when determining an overall matching score. To do so, the computing system 1100 may assign weights to the first matching score and the second matching score to create a more accurate overall matching score.

To describe the weighting process in further detail, the computing system 1100 may combine the first template matching score, defined as $R_s$, and the second template matching score, defined as $R_b$, using a formula. One example formula is shown below:

$$\frac{w_s R_s + w_b R_b}{w_s + w_b} = R_w$$

Referring to the formula above, $w_s$ may be a weight given to the first matching score (e.g. the area-based template matching score), while $w_b$ may be a weight given to the edge-based template matching. The formula may be used to yield a weighted template matching score $R_w$. The weights may be adjusted to set the relative importance of area-based template matching and edge-based template matching. For instance, if $w_b$ is greater than $w_s$, then the weighted template matching score $R_w$ may be more influenced by how closely a contour of visual details, e.g., the edges, in a scene match a contour of visual details in a template, as opposed to how much area of a pixel region in the scene matches a pixel region in the template.

In some embodiments, the processing circuit 1110 of the computing system may focus on the edge-regions by only determining a matching score for the edge regions of the image edge information and the template edge information. The overall template matching score $R_w$ may be determined without the use of any area-based matching. In embodiments, the area-based matching may be performed but not used in the overall template matching score $R_w$ (i.e., by adjusting the weights appropriately). In embodiments, the area-based matching may be omitted.

Once an overall template matching score has been determined for each of the templates, the computing system 1100 may use the overall template matching score in a process for generating and/or validating a detection hypothesis. The detection hypothesis is an identification of one or more objects, or portions thereof, in the image information representing the scene. For example, the computing system 1100 may generate the detection hypothesis that identifies one or more of the objects (e.g., objects 3510, 3520, 3530, 3540) based on the edges, corners, and/or dimensions of regions derived from the 2D image information and/or 3D image information. In embodiments, the overall template matching score may be used by the computing system 1100 to validate that the object of the detection hypothesis matches with the object in the scene. For example, the computing system 1100 may validate that the identity of the object of the detection hypothesis corresponds to the template with the highest value of the template matching score. As another example, the computing system 1100 may generate a detection hypothesis that provides more than one possible identity of the object when more than one of the overall template matching scores are above a matching threshold (e.g. a high probability exists that the object in the scene can be one of two or more different objects based on detected features, such as the object dimensions and the templates).

In embodiments, once the computing system 1100 has generated the detection hypothesis, the computing system 1100 uses the detection hypothesis in an additional step of performing a robot interaction. For example, the computing system 1100 may create a plan for a robot interaction between the aforementioned robot and the object represented by the image description. For example, the computing system 1100 may provide instruction to the robot to pick up the first object from a pallet and place said first object at a destination location. More generally, method 4000 may be used by a system to generate the detection hypothesis to identify an object and, subsequently, create instructions for a robot to interact with the identified object. For example, the instructions for the robot interaction with the object may include a trajectory for the robot arm to approach the identified object, operations for grasping the identified object, a trajectory for the robot arm to transfer the identified object to a placement position at a destination location, an operation for releasing the identified object at the target position, and/or a trajectory departing from the destination location.

The present technology described herein provides technical improvements to the existing computer-based image recognition and robotic control fields. Technical improvements an increase in overall accuracy of matching an image of a physical object with a model template as compared to using an area-based only template matching process. The combination of the area-based template matching process with the edge-based template matching process is further improved by placing additional focus on either the area-based template matching process or the edge-based template matching process, through the use of weights, when determining an overall matching score.

It will be apparent to one of ordinary skill in the relevant arts that other suitable modifications and adaptations to the methods and applications described herein can be made without departing from the scope of any of the embodiments. The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single component, module, or unit for purposes of clarity, it should be understood that the features and functions described herein may be performed by any combination of components, units, or modules. Thus, various changes and modifications may be affected by one skilled in the art without departing from the spirit or scope of the invention as defined in the appended claims.

Further embodiments include:

Embodiment 1 is a computing system including: a communication interface configured to communicate with a robot and with a camera having a camera field of view; at least one processing circuit configured, when one or more objects are or have been in the camera field of view, to perform the following: obtaining image information representing a first object of the one or more objects, wherein the image information is generated by the camera and describes at least an object appearance associated with the first object; determining a first template matching score which indicates a degree of match between the image information and visual description information of a model template, wherein the visual description information describes an object appearance; determining image edge information based on the image information representing the first object, wherein the image edge information identifies a first set of one or more edges detected from the image information, or indicates that no edge is detected from the image information; determining template edge information, wherein the template edge information identifies a second set of one or more edges detected from the visual description information of the model template, or indicates that no edge is detected from the visual description information; determining a second template matching score which indicates a degree of match between the image edge information and the template edge information; determining an overall template matching score based on the first template matching score and the second template matching score; and performing a robot interaction planning operation based on the overall template matching score, wherein the robot interaction planning operation is for planning robot interaction between the robot and the first object.

Embodiment 2 is the system of embodiment 1, wherein the at least one processing circuit is configured, when the first set of one or more edges are detected from the image information, to generate the image edge information as a first edge bitmap which identifies where the first set of one or more edges are located, and wherein the at least one processing circuit is configured to generate the second template matching score based on a comparison between the first edge bitmap and a second edge bitmap, wherein the second edge bitmap identifies where a second set of one or more edges are located in the model template based on visual description information.

Embodiment 3 is the system of embodiment 2, wherein the at least one processing circuit is configured to determine the second template matching score based on a maximum amount by which the first set of one or more edges detected from the image information is overlapping with the second set of one or more edges from the visual description information of the model template.

Embodiment 4 is the system of embodiment 3, wherein the at least one processing circuit is configured to determine the second template matching score in a manner which is independent of the first template matching score.

Embodiment 5 is the system of embodiments 2 to 4, wherein the first edge bitmap is a first binary bitmap which includes at least area pixels, wherein the area pixels of the first binary bitmap are pixels thereof that are assigned a first pixel value, wherein, when the first set of one or more edges are detected from the image information, the first binary bitmap further includes edge pixels, wherein the edge pixels of the first binary bitmap are pixels thereof that correspond to locations in the image information at which the first set of one or more edges are detected, wherein the edge pixels of the first binary bitmap are assigned a second pixel value, wherein the second edge bitmap is a second binary bitmap which includes at least area pixels, wherein the area pixels of the second binary bitmap are pixels thereof that are assigned the first pixel value, and wherein, when the second set of one or more edges are detected from the visual description information of the model template, the second binary bitmap further includes edge pixels, wherein the edge pixels of the second binary bitmap are pixels thereof that correspond to locations in the visual description information at which the second set of one or more edges are detected, and wherein the edge pixels of the second binary bitmap are assigned the second pixel value.

Embodiment 6 is the system of embodiment 5, wherein the at least one processing circuit is configured to determine the second template matching score based on a maximum amount the edge pixels of the first binary bitmap is overlapping with the edge pixels of the second binary bitmap.

Embodiment 7 is the system of embodiments 5 or 6, wherein the at least one processing circuit is configured to determine, for each edge of the first set of one or more edges, a respective priority level for the edge based on a technique by which the edge is detected from the image information, wherein the second template matching score is based on one or more respective priority levels associated with the first set of one or more edges.

Embodiment 8 is the system of embodiment 7, wherein the at least one processing circuit is configured to determine a respective priority level for each edge of the first set of one or more edges based on which one of the following techniques is used to detect the edge: (i) satisfying a defined pixel intensity discontinuity condition or a defined spiked pixel intensity condition at the edge, (ii) satisfying a defined depth discontinuity condition at the edge, or (iii) satisfying a defined orientation discontinuity condition at the edge.

Embodiment 9 is the system of embodiments 2 to 8, wherein the at least one processing circuit is configured to determine the first template matching score based on a degree of match between regions of the image information and corresponding regions of the visual description information.

Embodiment 10 is the system of embodiments 2 to 8, wherein when the visual description information of the model template includes pixels forming a template 2D region, the at least one processing circuit is configured to determine the first template matching score based on a degree of match between the template 2D region and a corresponding image 2D region that is from the image information or is generated based on the image information.

Embodiment 11 is the system of embodiment 10, wherein the at least one processing circuit is configured to perform an image normalization operation by generating, based on the image information, transformed image information which matches at least one of an object pose, viewpoint, or a lighting condition associated with the visual description information of the model template, and wherein the corresponding image 2D region is from the transformed image information.

Embodiment 12 is the system of embodiments 10 or 11, wherein the at least one processing circuit is configured to determine the first template matching score based on a size of overlap which indicates how many pixels in the template 2D region satisfy a defined pixel intensity similarity condition when compared to corresponding pixels of the image 2D region.

Embodiment 13 is the system of embodiments 1 to 12, wherein the at least one processing circuit is configured to determine the overall template matching score based on a weighted combination of the first template matching score and the second template matching score.

Embodiment 14 is the system of embodiments 1 to 13, wherein the at least one processing circuit is configured, when the first object is in the camera field of view, to determine whether a portion of the first object is not described by the image information, and in response to a determination that the portion of the first object is not described by the image information, to generate a masked version of the visual description information which excludes a corresponding portion of the visual description information, and to determine the first template matching score and determine the template edge information based on the masked version of the visual description information.

Embodiment 15 is a non-transitory computer-readable medium including instructions for execution by at least one processing circuit in communication with a camera having a field of view and configured, when one or more objects are or have been in the field of view, the instructions being configured for: obtaining image information representing a first object of the one or more objects, wherein the image information is generated by the camera and describes at least an object appearance associated with the first object; determining a first template matching score which indicates a degree of match between the image information and visual description information of a model template, wherein the visual description information describes an object appearance; determining image edge information based on the image information representing the first object, wherein the image edge information identifies a first set of one or more edges detected from the image information, or indicates that no edge is detected from the image information; determining template edge information, wherein the template edge information identifies a second set of one or more edges detected from the visual description information of the model template, or indicates that no edge is detected from the visual description information; determining a second template matching score which indicates a degree of match between the image edge information and the template edge information; determining an overall template matching score based on the first template matching score and the second template matching score; and performing a robot interaction planning operation based on the overall template matching score, wherein the robot interaction planning operation is for planning robot interaction between the robot and the first object.

Embodiment 16 is the non-transitory computer-readable medium of embodiment 15, wherein when the instruction are additionally configured for, when the first set of one or more edges are detected from the image information, to generate the image edge information as a first edge bitmap which identifies where the first set of one or more edges are located, and wherein the at least one processing circuit is configured to generate the second template matching score based on a comparison between the first edge bitmap and a second edge bitmap, wherein the second edge bitmap identifies where a second set of one or more edges are located in the model template based on visual description information.

Embodiment 17 is the non-transitory computer-readable medium of embodiment 16, wherein the instructions are additionally configured for determining the second template matching score based on a maximum amount by which the first set of one or more edges detected from the image information is overlapping with the second set of one or more edges from the visual description information of the model template.

Embodiment 18 is a method controlling a robotic system comprising a non-transitory computer-readable medium, at least one processing circuit in communication with a camera having a field of view and configured to execute instructions, the method including: obtaining image information representing a first object of the one or more objects, wherein the image information is generated by the camera and describes at least an object appearance associated with the first object; determining a first template matching score which indicates a degree of match between the image information and visual description information of a model template, wherein the visual description information describes an object appearance; determining image edge information based on the image information representing the first object, wherein the image edge information identifies a first set of one or more edges detected from the image information, or indicates that no edge is detected from the image information; determining template edge information, wherein the template edge information identifies a second set of one or more edges detected from the visual description information of the model template, or indicates that no edge is detected from the visual description information; determining a second template matching score which indicates a degree of match between the image edge information and the template edge information; determining an overall template matching score based on the first template matching score and the second template matching score; and performing a robot interaction planning operation based on the overall template matching score, wherein the robot interaction planning operation is for planning robot interaction between the robot and the first object.

Embodiment 19 is the method of embodiment 18, wherein when the instruction are additionally configured for, when the first set of one or more edges are detected from the image information, to generate the image edge information as a first edge bitmap which identifies where the first set of one or more edges are located, and wherein the at least one processing circuit is configured to generate the second template matching score based on a comparison between the first edge bitmap and a second edge bitmap, wherein the second edge bitmap identifies where a second set of one or more edges are located in the model template based on visual description information.

Embodiment 20 is the method of embodiment 19, wherein the instructions are additionally configured for determining the second template matching score based on a maximum amount by which the first set of one or more edges detected from the image information is overlapping with the second set of one or more edges from the visual description information of the model template.

The invention claimed is:

1. A computing system comprising:

a communication interface configured to communicate with a robot and with a camera having a camera field of view;

at least one processing circuit configured, when one or more objects are or have been in the camera field of view, to perform the following:

obtaining image information representing a first object of the one or more objects, wherein the image information is generated by the camera and describes at least an object appearance associated with the first object;

determining a first template matching score as an area-based template matching score which indicates a degree of match between a region of the image information and visual description information of a model template, wherein the visual description information describes an object appearance;

determining image edge information based on the image information representing the first object, wherein the image edge information identifies a first set of one or more edges corresponding to visual features on the surface of an object that is detected from the image information, or indicates that no edge is detected from the image information;

determining template edge information, wherein the template edge information identifies a second set of one or more edges detected from the visual description information of the model template, or indicates that no edge is detected from the visual description information;

determining a second template matching score as an edge-based template matching score which indicates a degree of match between the image edge information within the region and the template edge information;

determining an overall template matching score as a weighted fraction between the first template matching score and the second template matching score, wherein a first weight for the first template matching score is based in part on one or more reliability factors of the image information including damage to the object represented in the image information; and performing a robot interaction planning operation based on the overall template matching score, wherein the robot interaction planning operation is for planning robot interaction between the robot and the first object.

2. The computing system of claim 1, wherein the at least one processing circuit is configured, when the first set of one or more edges are detected from the image information, to generate the image edge information as a first edge bitmap which identifies where the first set of one or more edges are located, and wherein the at least one processing circuit is configured to generate the second template matching score based on a comparison between the first edge bitmap and a second edge bitmap, wherein the second edge bitmap identifies where a second set of one or more edges are located in the model template based on visual description information.

3. The computing system of claim 2, wherein the at least one processing circuit is configured to determine the second template matching score based on a maximum amount by which the first set of one or more edges detected from the image information is overlapping with the second set of one or more edges from the visual description information of the model template.

4. The computing system of claim 3, wherein the at least one processing circuit is configured to determine the second template matching score in a manner which is independent of the first template matching score.

5. The computing system of claim 2, wherein the first edge bitmap is a first binary bitmap which includes at least area pixels that are assigned a first pixel value, wherein, when the first set of one or more edges are detected from the image information, the first binary bitmap further includes edge pixels, wherein the edge pixels of the first binary bitmap are pixels thereof that correspond to locations in the image information at which the first set of one or more edges are detected, wherein the edge pixels of the first binary bitmap are assigned a second pixel value, wherein the second edge bitmap is a second binary bitmap which includes at least area pixels that are assigned the first pixel value, and wherein, when the second set of one or more edges are detected from the visual description information of the model template, the second binary bitmap further includes edge pixels, wherein the edge pixels of the second binary bitmap are pixels thereof that correspond to locations in the visual description information at which the second set of one or more edges are detected, and wherein the edge pixels of the second binary bitmap are assigned the second pixel value.

6. The computing system of claim 5, wherein the at least one processing circuit is configured to determine the second template matching score based on a maximum amount the edge pixels of the first binary bitmap is overlapping with the edge pixels of the second binary bitmap.

7. The computing system of claim 5, wherein the at least one processing circuit is configured to determine, for each edge of the first set of one or more edges, a respective priority level for the edge based on a technique by which the edge is detected from the image information, wherein the second template matching score is based on one or more respective priority levels associated with the first set of one or more edges.

8. The computing system of claim 7, wherein the at least one processing circuit is configured to determine a respective priority level for each edge of the first set of one or more edges based on which one of the following techniques is used to detect the edge: (i) satisfying a defined pixel intensity discontinuity condition or a defined spiked pixel intensity condition at the edge, (ii) satisfying a defined depth discontinuity condition at the edge, or (iii) satisfying a defined orientation discontinuity condition at the edge.

9. The computing system of claim 2, wherein the at least one processing circuit is configured to determine the first template matching score based on a degree of match between regions of the image information and corresponding regions of the visual description information.

10. The computing system of claim 2, wherein when the visual description information of the model template includes pixels forming a template 2D region, the at least one processing circuit is configured to determine the first template matching score based on a degree of match between the template 2D region and a corresponding image 2D region that is from the image information or is generated based on the image information.

11. The computing system of claim 10, wherein the at least one processing circuit is configured to perform an image normalization operation by generating, based on the image information, transformed image information which matches at least one of an object pose, viewpoint, or a lighting condition associated with the visual description information of the model template, and wherein the corresponding image 2D region is from the transformed image information.

12. The computing system of claim 10, wherein the at least one processing circuit is configured to determine the first template matching score based on a size of overlap which indicates how many pixels in the template 2D region satisfy a defined pixel intensity similarity condition when compared to corresponding pixels of the image 2D region.

13. The computing system of claim 1, wherein the at least one processing circuit is configured to determine the overall template matching score based on a weighted combination of the first template matching score and the second template matching score.

14. The computing system of claim 1, wherein the at least one processing circuit is configured, when the first object is in the camera field of view, to determine whether a portion of the first object is not described by the image information, and in response to a determination that the portion of the first object is not described by the image information, to generate a masked version of the visual description information which excludes a corresponding portion of the visual description information, and to determine the first template matching score and determine the template edge information based on the masked version of the visual description information.

15. A non-transitory computer-readable medium including instructions for execution by at least one processing circuit in communication with a camera having a field of view and configured, when one or more objects are or have been in the field of view, the instructions being configured for:

obtaining image information representing a first object of the one or more objects, wherein the image information is generated by the camera and describes at least an object appearance associated with the first object;

determining a first template matching score as an area-based template matching score which indicates a degree of match between a region of the image information and visual description information of a model template, wherein the visual description information describes an object appearance;

determining image edge information based on the image information representing the first object, wherein the image edge information identifies a first set of one or more edges corresponding to visual features on the surface of an object that is detected from the image information, or indicates that no edge is detected from the image information;

determining template edge information, wherein the template edge information identifies a second set of one or more edges detected from the visual description information of the model template, or indicates that no edge is detected from the visual description information;

determining a second template matching score as an edge-based template matching score which indicates a degree of match between the image edge information within the region and the template edge information;

determining an overall template matching score as a weighted fraction between the first template matching score and the second template matching score, wherein a first weight for the first template matching score is based in part on one or more reliability factors of the image information including damage to the object represented in the image information; and performing a robot interaction planning operation based on the overall template matching score, wherein the robot interaction planning operation is for planning robot interaction between the robot and the first object.

16. A non-transitory computer-readable medium of claim 15, wherein when the instruction are additionally configured for, when the first set of one or more edges are detected from the image information, to generate the image edge information as a first edge bitmap which identifies where the first set of one or more edges are located, and wherein the at least one processing circuit is configured to generate the second template matching score based on a comparison between the first edge bitmap and a second edge bitmap, wherein the second edge bitmap identifies where a second set of one or more edges are located in the model template based on visual description information.

17. The non-transitory computer-readable medium of claim 16, wherein the instructions are additionally configured for determining the second template matching score based on a maximum amount by which the first set of one or more edges detected from the image information is overlapping with the second set of one or more edges from the visual description information of the model template.

18. A method of controlling a robotic system comprising a non-transitory computer-readable medium, at least one processing circuit in communication with a camera having a field of view and configured to execute instructions, the method comprising:

obtaining image information representing a first object of the one or more objects, wherein the image information is generated by the camera and describes at least an object appearance associated with the first object;

determining a first template matching score as an area-based template matching score which indicates a degree of match between a region of the image information and visual description information of a model template, wherein the visual description information describes an object appearance;

determining image edge information based on the image information representing the first object, wherein the image edge information identifies a first set of one or more edges corresponding to visual features on the surface of an object that is detected from the image information, or indicates that no edge is detected from the image information;

determining template edge information, wherein the template edge information identifies a second set of one or more edges detected from the visual description information of the model template, or indicates that no edge is detected from the visual description information;

determining a second template matching score as an edge-based template matching score which indicates a degree of match between the image edge information within the region and the template edge information;

determining an overall template matching score as a weighted fraction between the first template matching score and the second template matching score, wherein a first weight for the first template matching score is based in part on one or more reliability factors of the image information including damage to the object represented in the image information; and performing a robot interaction planning operation based on the overall template matching score, wherein the robot interaction planning operation is for planning robot interaction between the robot and the first object.

19. The method of claim 18, wherein when the instructions are additionally configured for, when the first set of one or more edges are detected from the image information, to generate the image edge information as a first edge bitmap which identifies where the first set of one or more edges are located, and wherein the at least one processing circuit is configured to generate the second template matching score based on a comparison between the first edge bitmap and a second edge bitmap, wherein the second edge bitmap identifies where a second set of one or more edges are located in the model template based on visual description information.

20. The method of claim 19, wherein the instructions are additionally configured for determining the second template matching score based on a maximum amount by which the first set of one or more edges detected from the image information is overlapping with the second set of one or more edges from the visual description information of the model template.

* * * * *